US 9,010,109 B2

(12) United States Patent
Marques et al.

(10) Patent No.: US 9,010,109 B2
(45) Date of Patent: Apr. 21, 2015

(54) TURBINE WASTEGATE

(71) Applicant: Honeywell International Inc., Morristown, NJ (US)

(72) Inventors: Manuel Marques, Richardmenil (FR); Manuel Gonzalez, Maule (FR); Lionel Toussaint, Gerardmer (FR)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/949,384

(22) Filed: Jul. 24, 2013

(65) Prior Publication Data
US 2014/0072411 A1 Mar. 13, 2014

Related U.S. Application Data

(63) Continuation-in-part of application No. 13/613,250, filed on Sep. 13, 2012, now Pat. No. 8,904,785.

(51) Int. Cl.
F02D 23/00 (2006.01)
F01D 17/10 (2006.01)
F16K 1/20 (2006.01)
F02B 37/18 (2006.01)
F01D 25/24 (2006.01)

(52) U.S. Cl.
CPC .......... F01D 17/105 (2013.01); F16K 1/2014 (2013.01); F02B 37/183 (2013.01); Y02T 10/144 (2013.01); F01D 25/24 (2013.01)

(58) Field of Classification Search
CPC ...... F02B 37/18; F02B 37/183; F02B 37/186; F01D 17/105; F01D 17/20; F01D 25/24; F05D 2220/40; F05D 2240/14

USPC ............ 60/602; 415/144; 251/299, 298, 333, 251/356
See application file for complete search history.

(56) References Cited

U.S. PATENT DOCUMENTS 1,524,267 A * 1/1925 Loop ............................. 251/167
3,144,876 A 8/1964 Frye
(Continued)

FOREIGN PATENT DOCUMENTS

DE     4439432 C1    11/1995
DE    19705422 C1     9/1998
(Continued)

OTHER PUBLICATIONS

Continental "New Turbocharger with Electrical Waste-Gate Actuation", May 11, 2011 (26 pages).
(Continued)

Primary Examiner — Thai Ba Trieu
Assistant Examiner — Jason T Newton
(74) Attorney, Agent, or Firm — Brian J. Pangrle

(57) ABSTRACT

An assembly can include a turbine housing that includes a bore, a wastegate seat and a wastegate passage that extends to the wastegate seat; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a torus, for contacting the wastegate seat to cover the wastegate passage and, for example, defined in part by a portion of a modified sphere or a portion of a cone. Various other examples of devices, assemblies, systems, methods, etc., are also disclosed.

16 Claims, 19 Drawing Sheets

(56) References Cited

U.S. PATENT DOCUMENTS

| | | | |
|---|---|---|---|
| 4,098,085 A * | 7/1978 | McDowell | 60/602 |
| 4,120,156 A | 10/1978 | McInerney | |
| 4,121,607 A * | 10/1978 | Bader | 137/454.5 |
| 4,274,436 A | 6/1981 | Smith | |
| 4,480,815 A * | 11/1984 | Kreij | 251/298 |
| 4,702,209 A * | 10/1987 | Sausner et al. | 123/339.27 |
| 4,730,456 A * | 3/1988 | Tadokoro et al. | 60/602 |
| 4,794,758 A | 1/1989 | Nakazawa | |
| 4,872,480 A | 10/1989 | Scaramucci | |
| 5,044,604 A * | 9/1991 | Topham et al. | 251/120 |
| 5,046,317 A | 9/1991 | Satokawa | |
| 5,996,348 A * | 12/1999 | Watkins | 60/602 |
| 6,035,638 A | 3/2000 | Lamsbach et al. | |
| 6,269,643 B1 | 8/2001 | Schmidt et al. | |
| 6,969,048 B2 * | 11/2005 | Colic et al. | 251/357 |
| 7,108,244 B2 * | 9/2006 | Hardin | 251/333 |
| 7,931,252 B2 * | 4/2011 | Shindo et al. | 251/333 |
| 2006/0239812 A1* | 10/2006 | Friedel et al. | 415/115 |
| 2007/0068496 A1* | 3/2007 | Wright | 123/527 |
| 2008/0237526 A1* | 10/2008 | Albert et al. | 251/356 |
| 2011/0000209 A1* | 1/2011 | Boening et al. | 60/602 |
| 2011/0173974 A1* | 7/2011 | Grabowska | 60/602 |
| 2012/0312010 A1 | 12/2012 | Yasoshima et al. | |

FOREIGN PATENT DOCUMENTS

| | | |
|---|---|---|
| DE | 19853391 A1 | 5/2000 |
| DE | 102009015899 A1 | 10/2010 |
| EP | 1988265 A1 | 11/2008 |
| EP | 2050939 A1 | 4/2009 |
| EP | 2251533 A1 | 11/2010 |
| EP | 2444626 A1 | 4/2012 |
| EP | 2489853 A1 | 8/2012 |
| JP | 1990131032 U1 | 10/1990 |
| JP | 1994043227 U | 6/1994 |
| WO | 2009106161 A1 | 9/2009 |
| WO | 2010039596 A2 | 4/2010 |
| WO | 2011108331 A1 | 9/2011 |

OTHER PUBLICATIONS

EP Appl. No. 13183258.6-1606 European Search Report, Dec. 18, 2013 (3 pages).

EP Appl. No. 13 183 258.6-1606 EPO Examination Report of Feb. 14, 2014 (5 pages).

* cited by examiner

TURBINE WASTEGATE

RELATED APPLICATIONS

This application is a continuation-in-part of a U.S. patent application having Ser. No. 13/613,250, filed 13 Sep. 2012, which is incorporated herein.

TECHNICAL FIELD

Subject matter disclosed herein relates generally to turbomachinery for internal combustion engines and, in particular, to turbine wastegates.

BACKGROUND

A turbine wastegate is typically a valve that can be controlled to selectively allow at least some exhaust to bypass a turbine. Where an exhaust turbine drives a compressor for boosting inlet pressure to an internal combustion engine (e.g., as in a turbocharger), a wastegate provides a means to control the boost pressure.

A so-called internal wastegate is integrated at least partially into a turbine housing. An internal wastegate typically includes a flapper valve (e.g., a plug), a crank arm, a shaft or rod, and an actuator. A plug of a wastegate often includes a flat disk shaped surface that seats against a flat seat (e.g., a valve seat or wastegate seat) disposed about an exhaust bypass opening, though various plugs may include a protruding portion that extends into an exhaust bypass opening (e.g., past a plane of a wastegate seat).

In a closed position, a wastegate plug should be seated against a wastegate seat (e.g., seating surface) with sufficient force to effectively seal an exhaust bypass opening (e.g., to prevent leaking of exhaust from a high pressure exhaust supply to a lower pressure region). Often, an internal wastegate is configured to transmit force from an arm to a plug (e.g., as two separate, yet connected components). During engine operation, load requirements for a wastegate vary with pressure differential. High load requirements can generate high mechanical stresses in a wastegate's kinematics components, a fact which has led in some instances to significantly oversized component design to meet reliability levels (e.g., as demanded by engine manufacturers). Reliability of wastegate components for gasoline engine applications is particularly important where operational temperatures and exhaust pulsation levels can be quite high.

Various examples of wastegates and wastegate components are described herein, which can optionally provide for improved kinematics, reduced exhaust leakage, etc.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
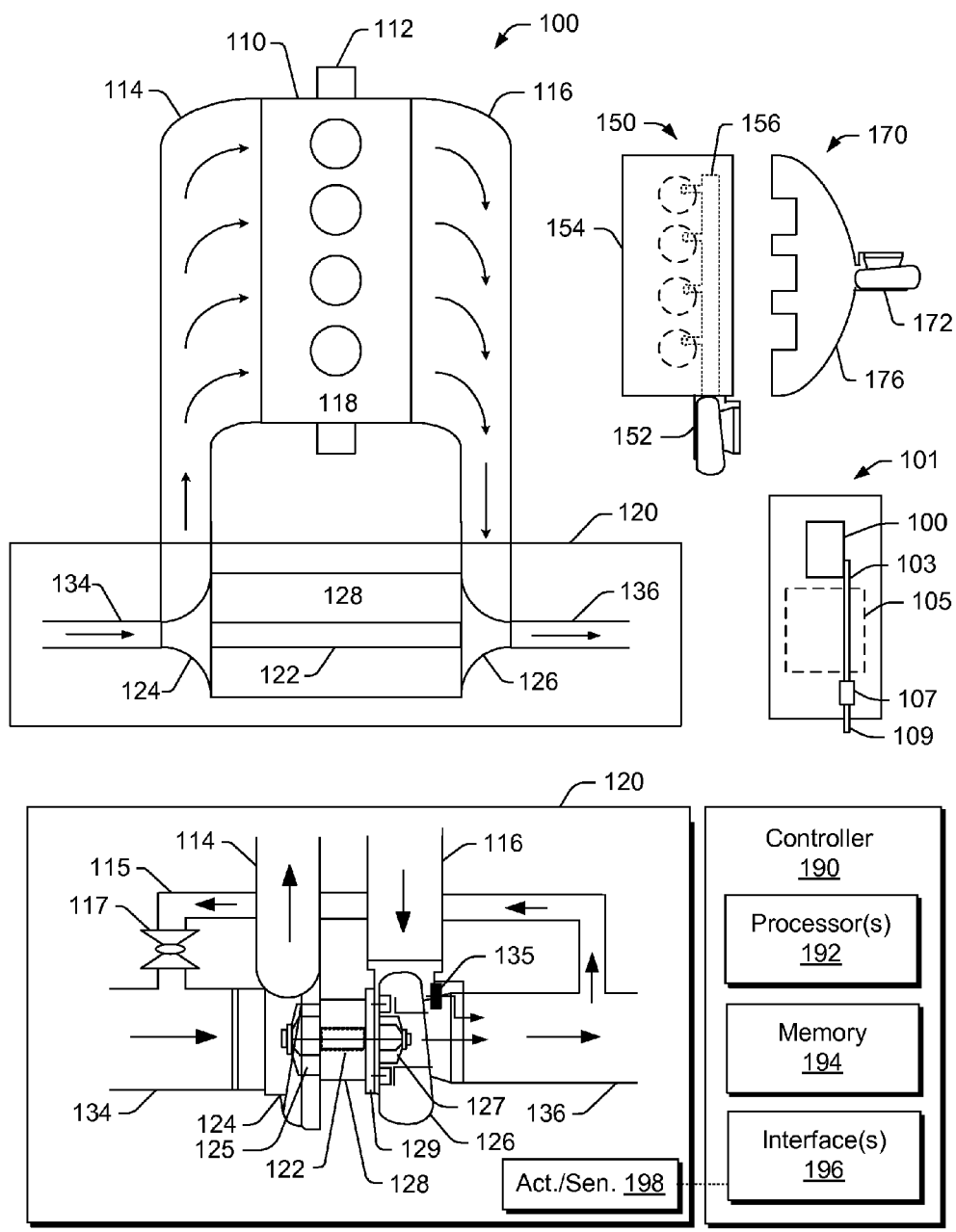
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing 128 may be referred to as a center housing assembly as it is disposed between the compressor housing assembly 124 and the turbine housing assembly 126. The shaft 122 may be a shaft assembly that includes a variety of components. The shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc.

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
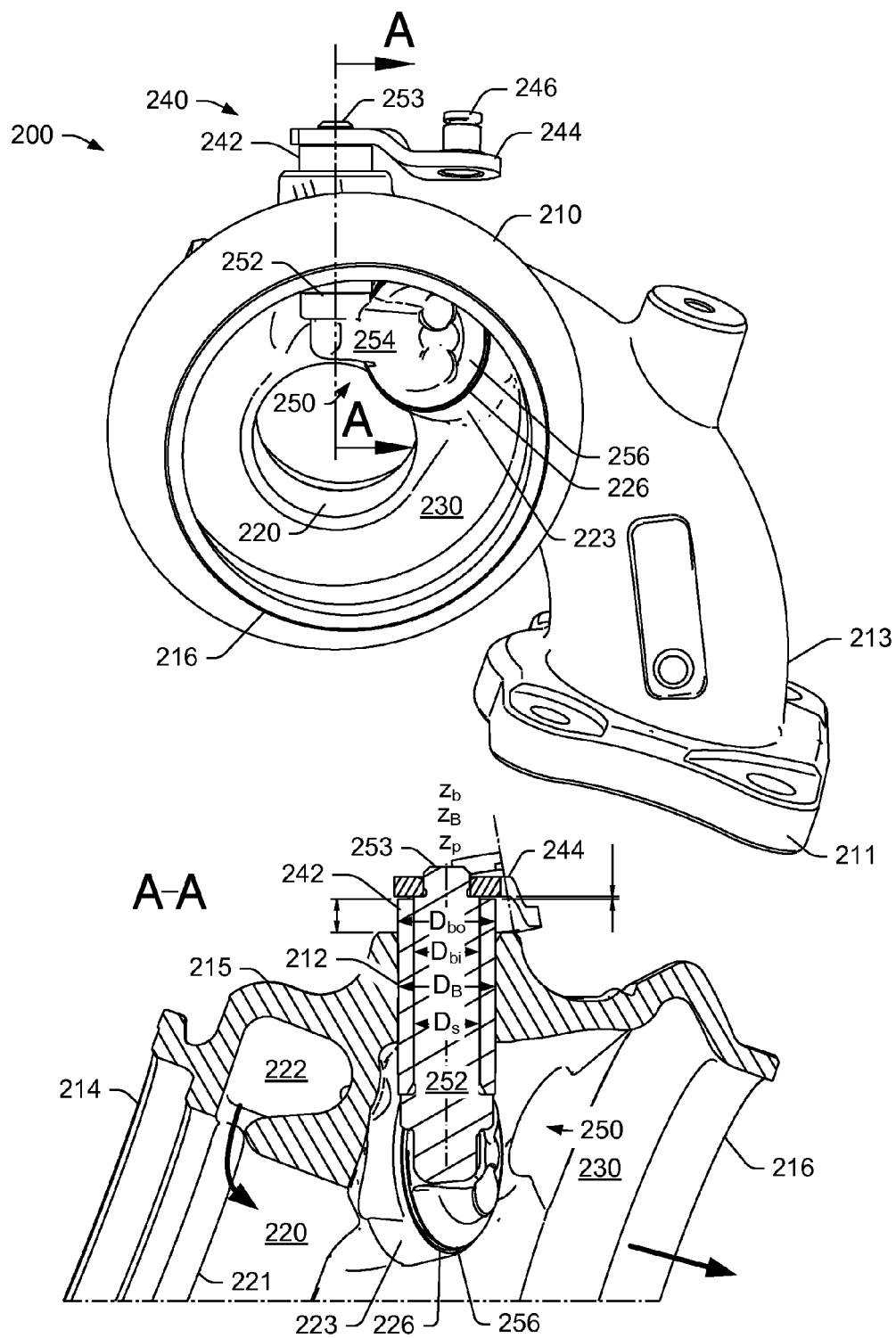
FIG. 2 is a series of view of an example of an assembly that includes a wastegate.

FIG. 2 shows an example of an assembly 200 that includes a turbine housing 210 that includes a flange 211, a bore 212, an inlet conduit 213, a turbine wheel opening 214, a spiral wall 215, an exhaust outlet opening 216, a shroud wall 220, a nozzle 221, a volute 222 formed in part by the spiral wall 215, a wastegate wall 223 that extends to a wastegate seat 226, and an exhaust chamber 230. In the example of FIG. 2, the turbine housing 210 may be a single piece or multi-piece housing. As an example, the turbine housing 210 may be a cast component (e.g., formed via sand casting or other casting process). The turbine housing 210 includes various walls, which can define features such as the bore 212, the turbine wheel opening 214, the exhaust outlet opening 216, the chamber 230, etc. In particular, the wastegate wall 223 defines a wastegate passage in fluid communication with the inlet conduit 213 where a wastegate control linkage 240 and a wastegate arm and plug 250 are configured for opening and closing the wastegate passage (e.g., for wastegating exhaust).

In the example of FIG. 2, the wastegate control linkage 240 includes a bushing 242 configured for receipt by the bore 212 of the turbine housing 210, a control arm 244 and a peg 246 and the wastegate arm and plug 250 includes a shaft 252, a shaft end 253, an arm 254 and a plug 256. As shown, the bushing 242 is disposed between the bore 212 and the shaft 252, for example, to support rotation of the shaft 252, to seal the chamber 230 from an exterior space, etc. The bore 212, the bushing 242 and the shaft 252 may each be defined by a diameter or diameters as well as one or more lengths. For example, the shaft 252 includes a diameter $D_s$, the bore 212 includes a diameter $D_B$ while the bushing includes an inner diameter $D_{bi}$ and an outer diameter $D_{bo}$. In the example of FIG. 2, when the various components are assembled, $D_B > D_{bo} > D_{bi} > D_s$. As to lengths, a length of the shaft 252 exceeds a length of the bushing 242, which exceeds a length of the bore 212. Such lengths may be defined with respect to a shaft axis $z_s$, a bushing axis $z_b$ and a bore axis $z_B$. As shown, the bushing 242 is disposed axially between a shoulder of the shaft 252 and the control arm 244 of the control linkage 240.

As an example, the assembly 200 may be fitted to an exhaust conduit or other component of an internal combustion engine (see, e.g., examples of FIG. 1) via the flange 211 such that exhaust is received via the inlet conduit 213, directed to the volute 222. From the volute 222, exhaust is directed via the nozzle 221 to a turbine wheel disposed in the turbine housing 210 via the opening 214 to flow and expand in a turbine wheel space defined in part by the shroud wall 220. Exhaust can then exit the turbine wheel space by flowing to the chamber 230 and then out of the turbine housing 210 via the exhaust outlet opening 216. As to wastegating, upon actuation of the control linkage 240 (e.g., by an actuator coupled to the peg 246), the wastegate arm and plug 250 may be rotated such that at least a portion of the received exhaust can flow in the wastegate passage defined by the wastegate wall 223, past the wastegate seat 226 and into the chamber 230, rather than through the nozzle 221 to the turbine wheel space. The wastegated portion of the exhaust may then exit the turbine housing 210 via the exhaust outlet opening 216 (e.g., and pass to an exhaust system of a vehicle, be recirculated in part, etc.).

In the example of FIG. 2, the axes of the bore 212, the bushing 242 and the shaft 252 are shown as being aligned (e.g., defining a common axis), however, during assembly, operation, etc., some misalignment may occur. For example, over time, clearances between the various components (e.g., plug, arm, shaft, bore, bushing, etc.) can change. Forces that can cause such change include aerodynamic excitation, high temperatures, temperature cycling (e.g., temperatures <−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

Figure 3:
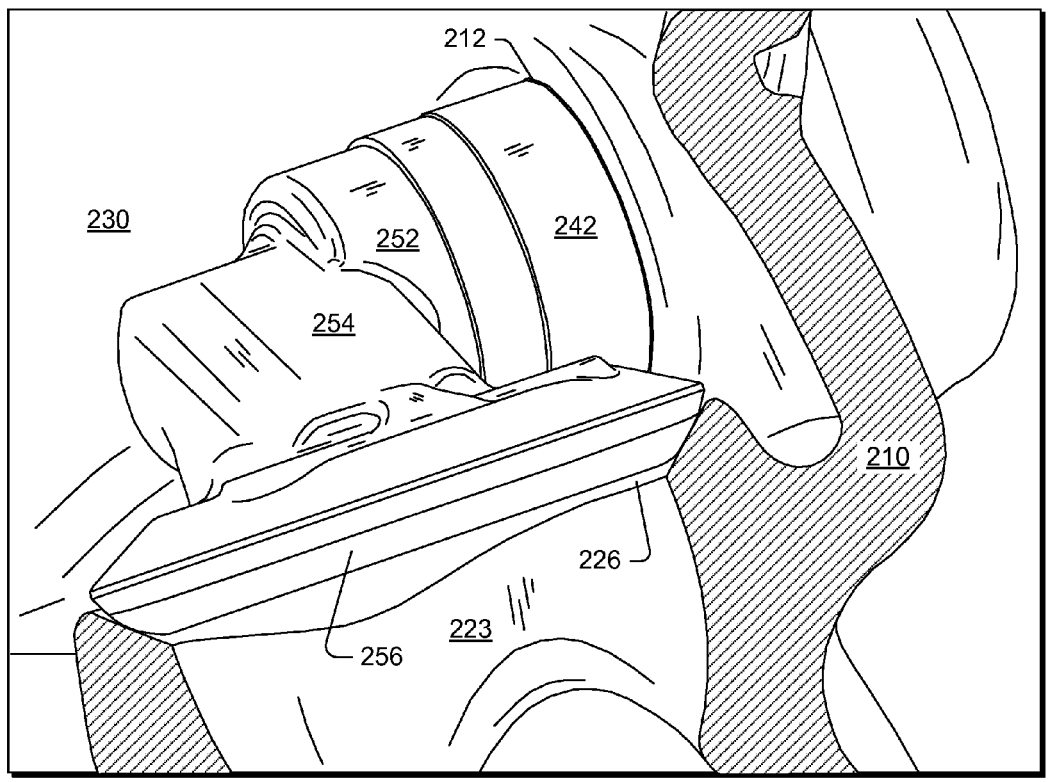
FIG. 3 is a cutaway view of a portion of the assembly of FIG. 2.

FIG. 3 shows an enlarged cutaway view of a portion of the assembly 200 of FIG. 2. As shown, the plug 256 seats in the wastegate seat 226 to seal the wastegate passage defined by the wastegate wall 223, which is part of the turbine housing 210.

Figure 4:
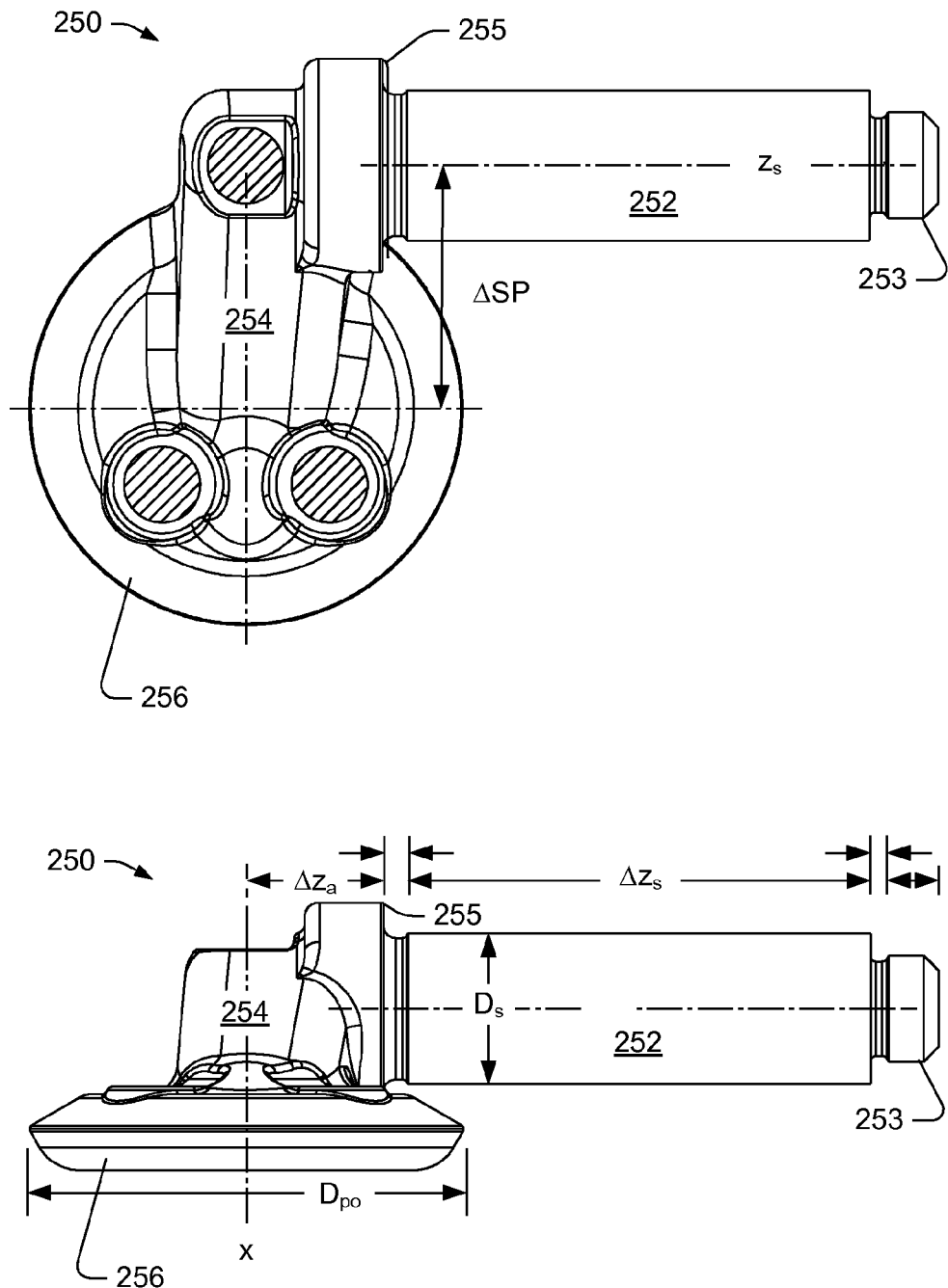
FIG. 4 is a series of views of an example of a wastegate arm and plug.

FIG. 4 shows a plan view and a side view of the wastegate arm and plug 250 of the assembly of FIG. 2. As shown, the shaft 252 has a diameter $D_s$ over a length $\Delta z_s$. The arm 254 extends axially outwardly away from the shaft 252 from a shoulder 255 and radially downwardly to the plug 256. An axial dimension $\Delta z_a$ is shown in the example of FIG. 4 as being a distance from the shoulder 255 to a centerline of the plug 256. The plug 256 is shown as having an outer diameter $D_{po}$. A dimension $\Delta SP$ is shown in the plan view as an offset between the axis $z_s$ of the shaft 252 and the centerline of the plug 256. As an example, the centerline of the plug 256 may define or coincide with an x-axis that may, for example, be used as a reference to describe features of the arm 254, the plug 256, angles of rotation of the arm 254 and the plug 256, etc. The dimension ASP may be a leg of a triangle that, for example, defines a hypotenuse as a dimension between a rotational axis of the arm 254 and the centerline of the plug 256. FIG. 4 also shows various other features, for example, shaft features such as shoulders, contours, etc.

Figure 5:
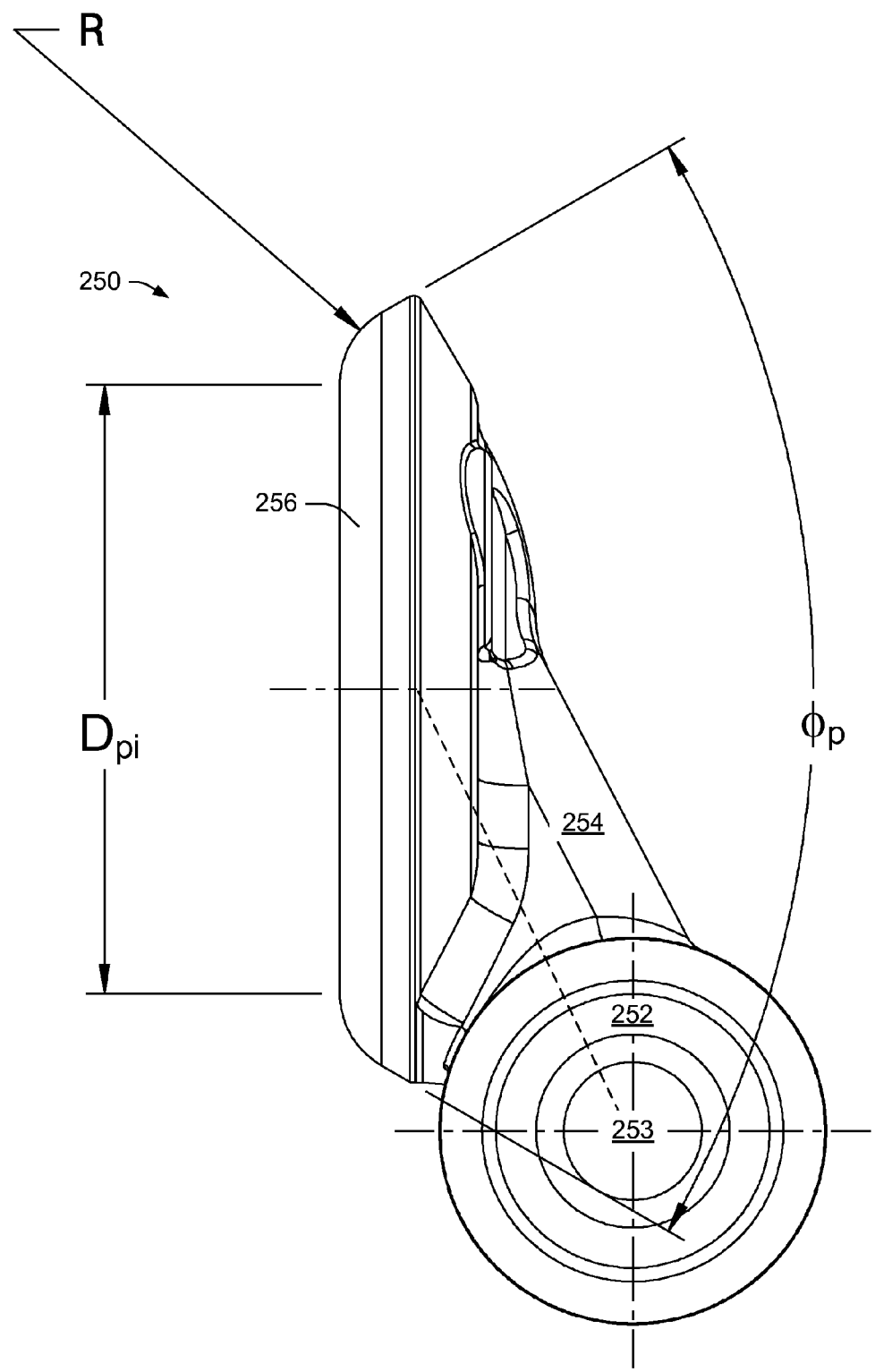
FIG. 5 is a side view of the wastegate arm and plug of FIG. 4.

FIG. 5 shows another side view of the wastegate arm and plug 250. In the example of FIG. 5, a profile of the plug 256 is illustrated that includes a conical portion and a radiused portion that may define an inner diameter $D_{pi}$. As shown, the conical portion may be defined according to a cone angle $\phi_p$ while the radiused portion may be defined with respect to a radius R. As an example, the radiused portion may be referred to as a toroidal portion or a toroidal surface. While the toroidal portion extends to a conical portion in the example of FIG. 4, a toroidal portion may continue as a radiused portion or extend to a non-conical or other portion. As an example, a plug can include toroidal surface disposed between an inner diameter and an outer diameter of a plug (e.g., a toroidal surface disposed between $D_{pi}$ and $D_{po}$).

Figure 6:
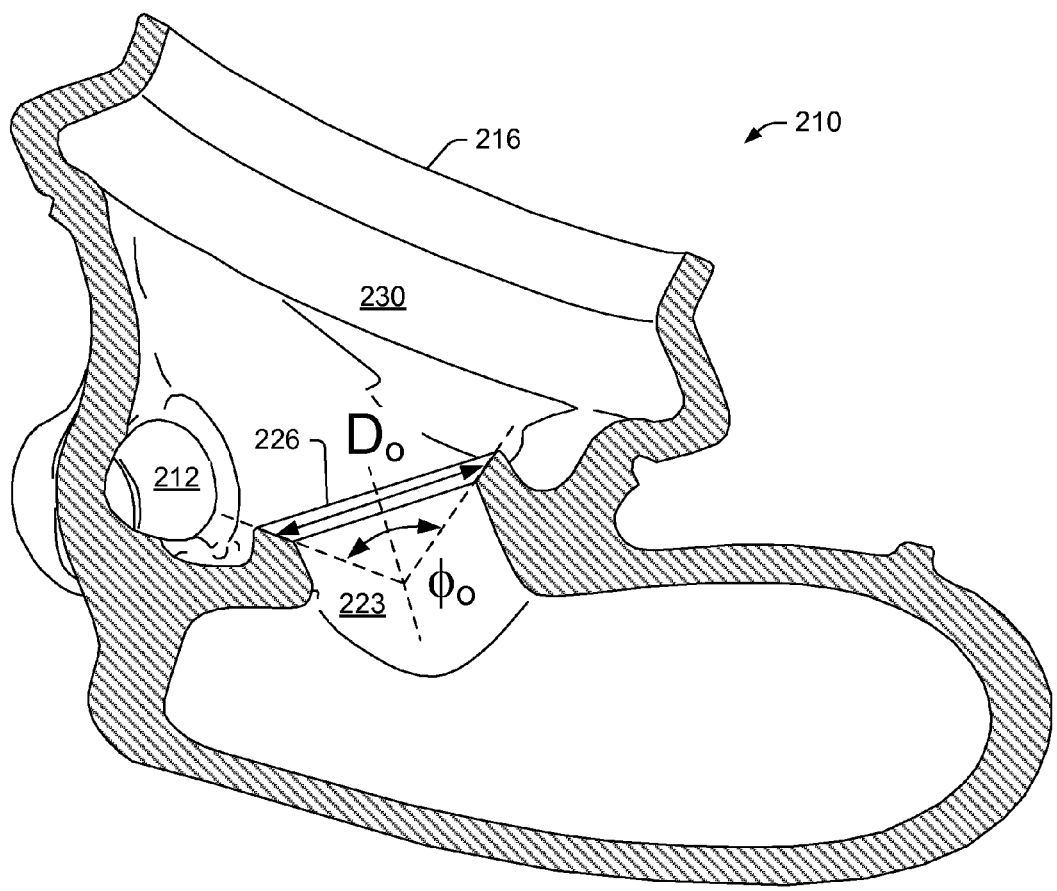
FIG. 6 is a cutaway view of an example of a turbine housing.

FIG. 6 shows a cutaway view of the turbine housing 210, particularly to show a relationship between the bore 212 and the wastegate seat 226 as these features cooperate with a wastegate arm and plug such as the wastegate arm and plug 250. As shown in the example of FIG. 6, the wastegate wall 223 extends to the wastegate seat 226, which includes a diameter $D_o$ of a cone section disposed at a cone angle $\phi_o$. As an example, an assembly may include a plug with a cone portion having a cone angle of about 60 degrees while a wastegate seat includes a cone portion with a cone angle of about 100 degrees. In such an example, contact may or may not occur between the two cone portions as sealing may be achieved by contact between a toroidal portion of the plug and the cone portion of the wastegate seat.

Figure 7:
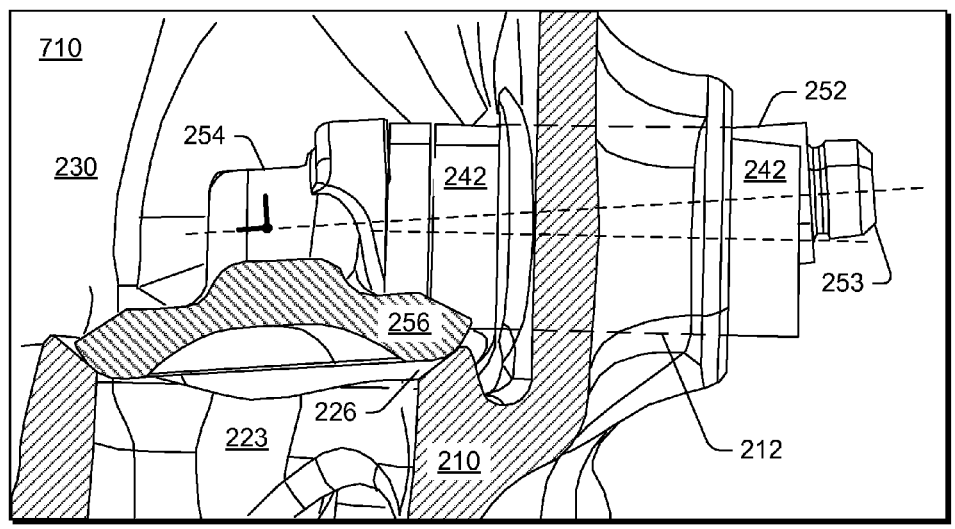
FIG. 7 is a series of cutaway views of a wastegate arm and plug in two different orientations.
Figure 7:
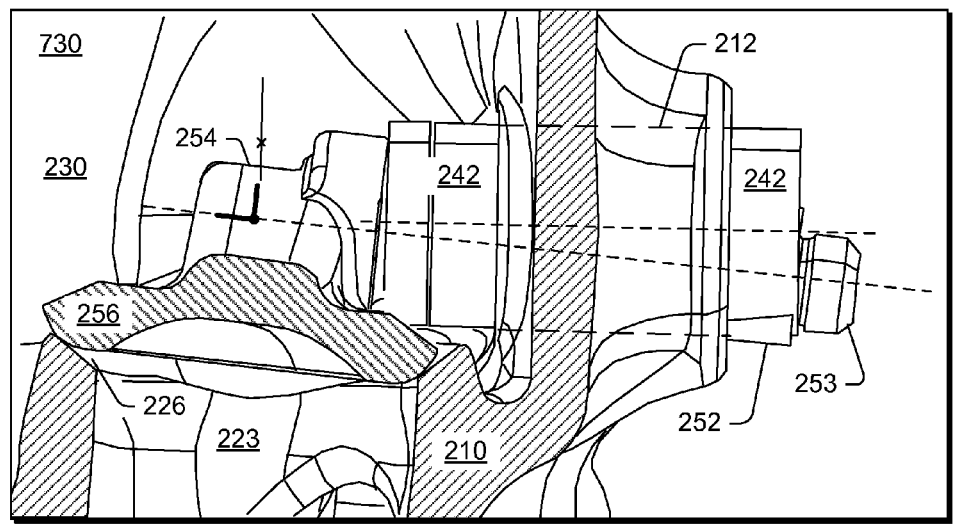

FIG. 7 shows two displaced orientations 710 and 730 of the wastegate arm and plug 250 within the assembly 200, in particular, where the axis of the shaft 252 of the wastegate arm and plug 250 is not aligned with, for example, the axis of the bore 212 (e.g., and the axis of the bushing 242 disposed in the bore 212).

In the orientations 710 and 730, contact exists between the plug 256 and the wastegate seat 226. In particular, contact exists between a radiused portion (e.g., toroidal portion) of the plug 256 and a conical portion of the wastegate seat 226.

As an example, the orientations 710 and 730 may represent maximum angular misalignments with respect to a bore axis of a bore (e.g., ±5 degrees), for example, where some angular misalignment with respect to a bushing axis of a bushing disposed in the bore (e.g., ±1 degree). As mentioned, for a variety of reasons, some misalignment may occur (e.g., during assembly, during operation, etc.).

Figure 8:
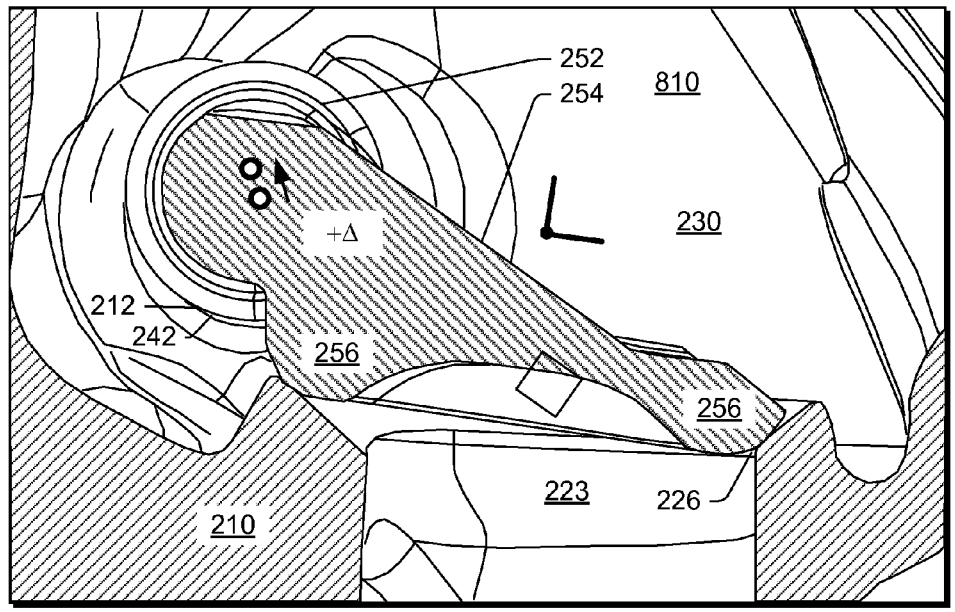
FIG. 8 is a series of cutaway views of a wastegate arm and plug in two different orientations.
Figure 8:
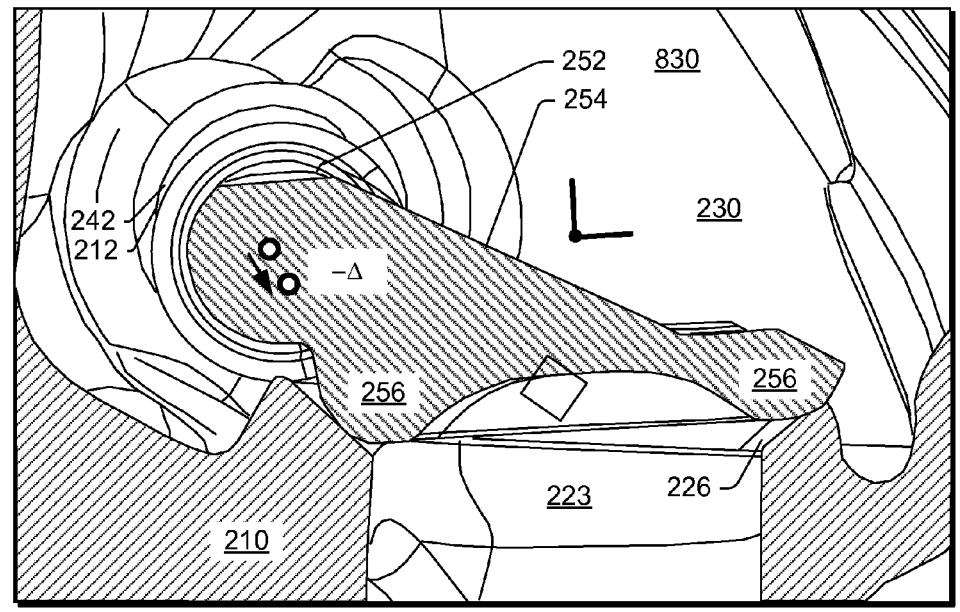

FIG. 8 shows two displaced orientations 810 and 830 of the wastegate arm and plug 250 within the assembly 200, in particular, where the axis of the shaft 252 of the wastegate arm and plug 250 is not aligned with, for example, the axis of the bore 212 (e.g., and the axis of the bushing 242 disposed in the bore 212).

In the orientations 810 and 830, contact exists between the plug 256 and the wastegate seat 226. In particular, contact exists between a radiused portion (e.g., toroidal portion) of the plug 256 and a conical portion of the wastegate seat 226. As an example, the orientations 810 and 830 may represent maximum displacement misalignments (e.g., Δ) with respect to a bore axis of a bore (e.g., ±1.6 mm), for example, where some displacement misalignment with respect to a bushing axis of a bushing disposed in the bore (e.g., ±0.1 mm). As mentioned, for a variety of reasons, some misalignment may occur (e.g., during assembly, during operation, etc.).

As an example, a wastegate arm and plug may include extreme positions inside a bushing disposed in a bore of a turbine housing while being able to maintain contact with a wastegate seat for purposes of sealing a wastegate passage (e.g., adequate sealing for acceptable performance).

Figure 9:
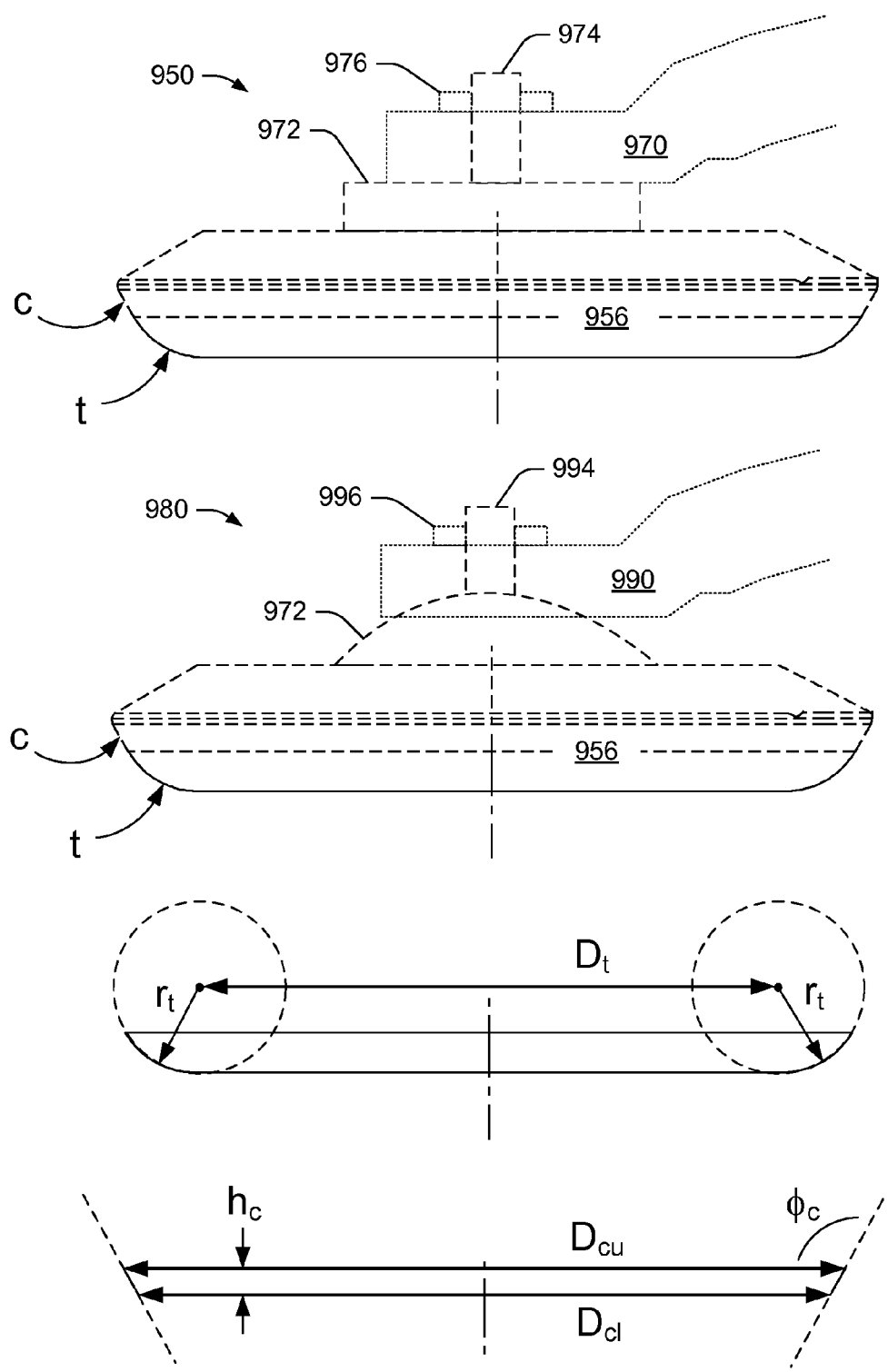
FIG. 9 is a series of diagrams of examples of wastegate arm and plug and profiles thereof.

FIG. 9 shows examples of a wastegate arm and plug 950 and 970, which may be a unitary wastegate arm and plug (e.g., a monoblock wastegate arm and plug) or a wastegate arm and plug assembly. As an assembly, a plug portion 956 may include an attachment base 972 or 992 from which a stem 974 or 994 extends where an arm 970 or 990 fits to the stem 974 or 994, which is secured to the stem 974 or 994 via an attachment component 976 or 996 (e.g., a press-fit ring, etc.). In the example wastegate arm and plug 970, a surface of an attachment base 992 may be defined at least in part by a portion of a sphere. In such an example, the arm 990 may include a surface defined at least in part by a portion of a sphere. In such an example, some pivoting may be provided for the plug portion 956 with respect to the arm 990 (e.g., as provided by some amount of clearance or clearances with respect to the stem 994).

In the example of FIG. 9, the plug portion 956 includes a toroidal portion "t" and, for example, optionally a conical portion "c". As shown, the optional conical portion may be defined by an angle $\phi_c$, a height $h_c$, and at least one of a lower diameter $D_{cl}$ and an upper diameter $D_{cu}$. In the example of FIG. 9, the toroidal portion may be defined by a diameter $D_t$ and a radius $r_t$, for example, where the toroidal portion may be defined by a circular torus.

Figure 10:
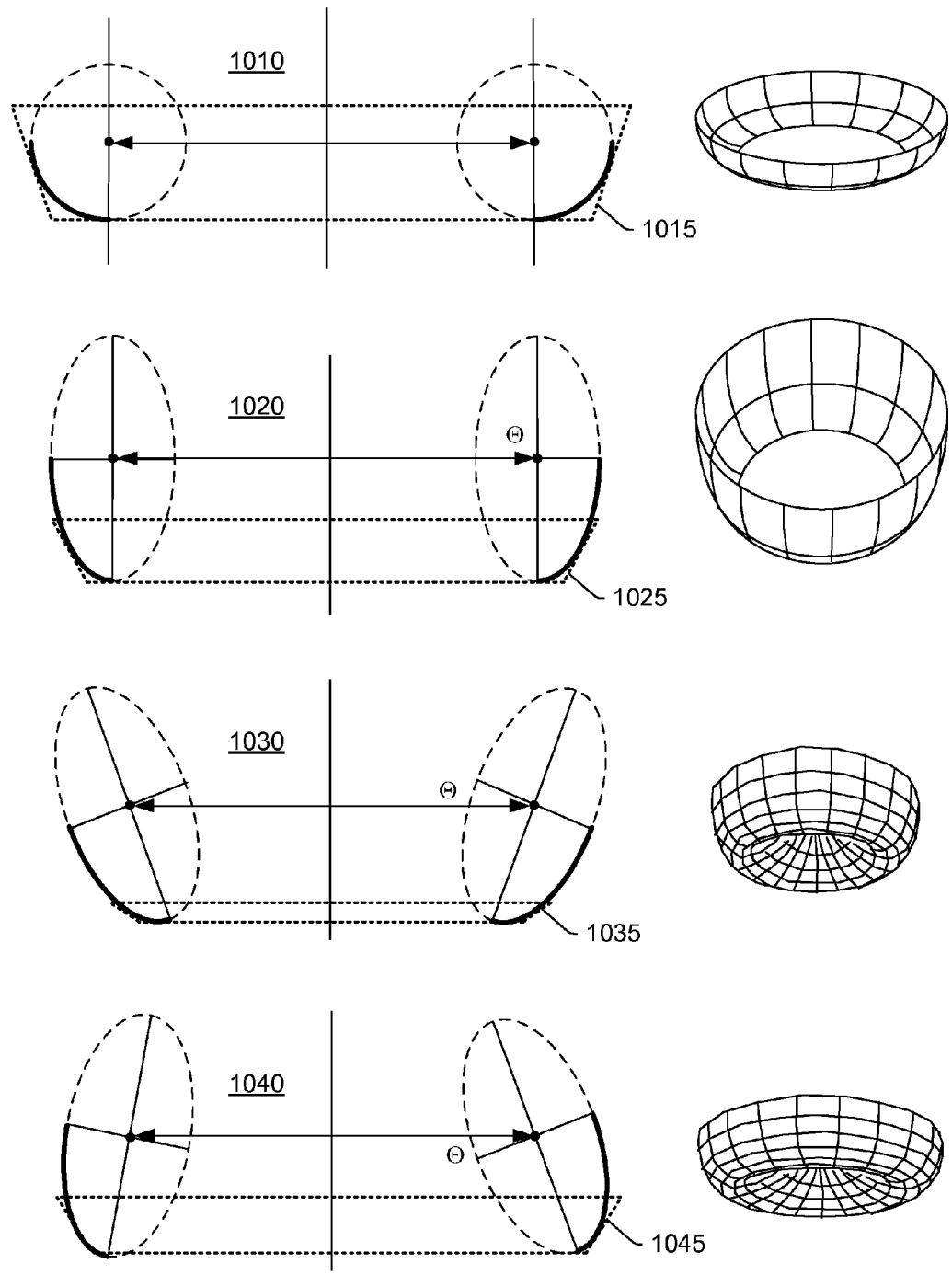
FIG. 10 is a series of views of examples of profiles of a plug.

FIG. 10 shows some examples of toroidal portion profiles of a plug 1010, 1020, 1030 and 1040 along with some examples of seat profiles 1015, 1025, 1035 and 1045. Also shown in FIG. 10 are gridded surfaces that may approximate respective toroidal portions.

As to the example profile 1010, the toroidal portion corresponds to a circle, as to the example profile 1020, the toroidal portion corresponds to an ellipse, as to the example profile 1030, the toroidal portion corresponds to an inwardly tilted ellipse and, as to the example profile 1040, the toroidal portion corresponds to an outwardly tilted ellipse (see, e.g., tilt angle Θ). In the examples 1010, 1020, 1030 and 1040 of FIG. 10, a thick solid line represents a profile that may be a profile of a plug, for example, such as the plug 256. As to the seat profiles 1015, 1025, 1035 and 1045, the dotted lines may represent a profile that may be a profile of a seat, for example, such as the seat 226.

Figure 11:
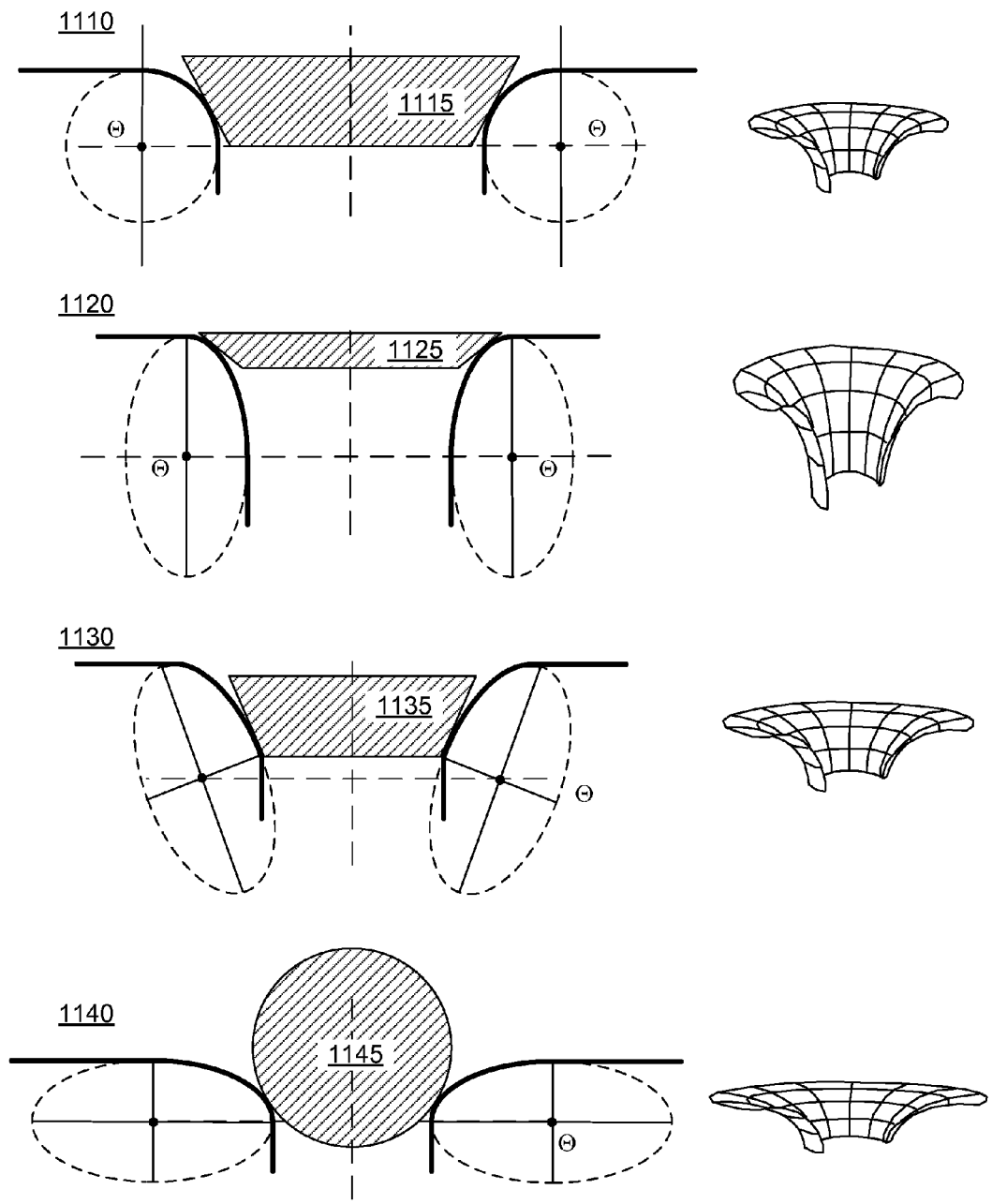
FIG. 11 is a series of views of examples of profiles of a seat.

FIG. 11 shows some examples of seat profiles of a wastegate seat 1110, 1120, 1130 and 1140 along with some examples of plug profiles 1115, 1125, 1135 and 1145. Also shown in FIG. 11 are gridded surfaces that may approximate respective seat profiles. As to the example profile 1110, the seat may be defined by a toroidal portion that corresponds to a circle, as to the example profile 1120, the seat may be defined by a toroidal portion that corresponds to an ellipse, as to the example profile 1130, the seat may be defined by a toroidal portion that corresponds to an outwardly tilted ellipse (see, e.g., tilt angle Θ) and, as to the example profile 1140, the seat may be defined by a toroidal portion that corresponds to an ellipse (e.g., rotated 90 degrees in comparison to the example 1120). In the examples 1110, 1120, 1130 and 1140 of FIG. 11, a thick solid line represents a profile that may be a profile of a seat, for example, such as the seat 226. As to the plug profiles 1115, 1125, 1135 and 1145, they may be a profile of a plug, for example, such as the plug 256. As shown in FIG. 11, a plug may include a conical profile or a spherical profile. As shown in various other examples, a plug may include a toroidal profile.

Figure 12:
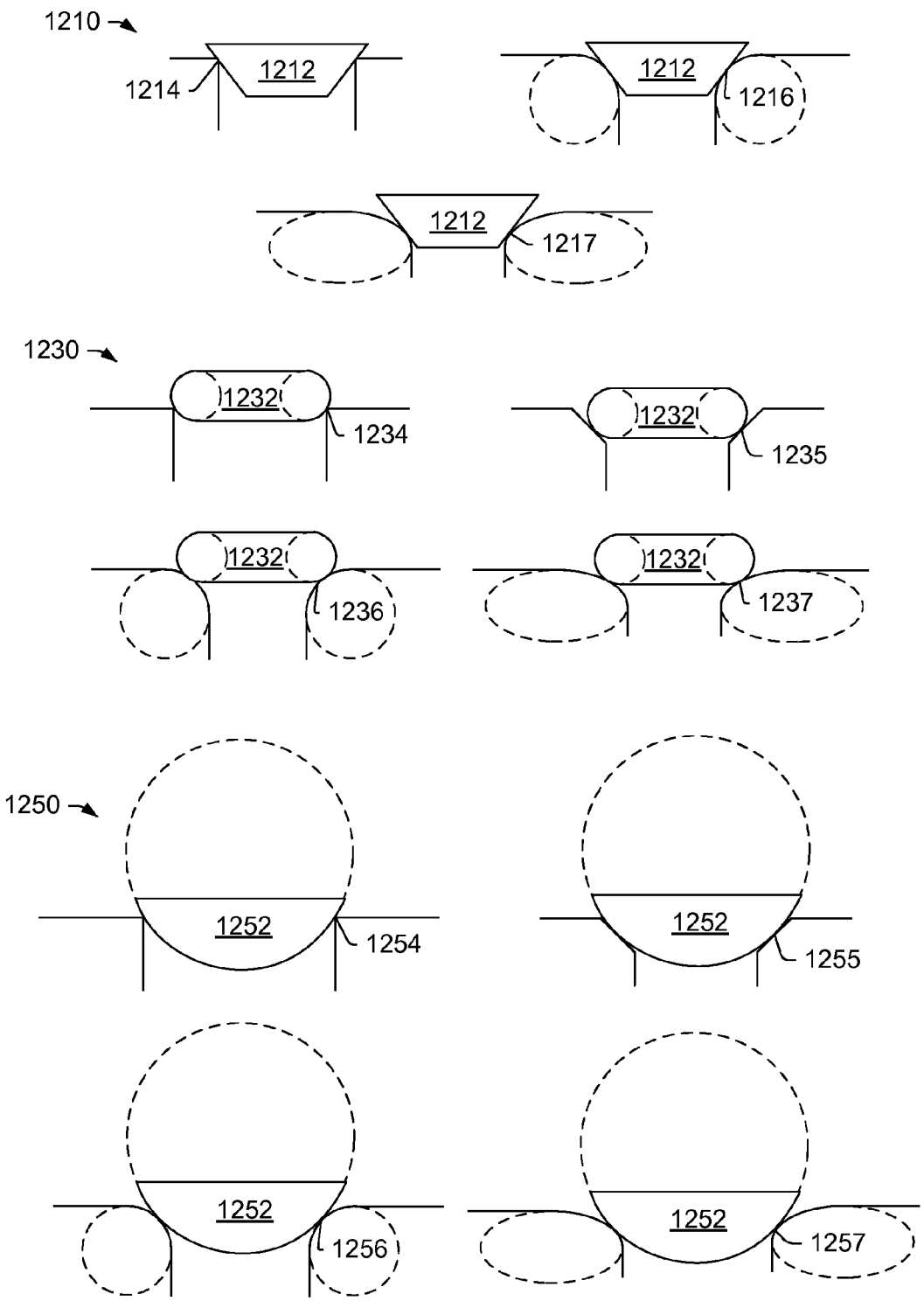
FIG. 12 is a series of views of examples of turbine wastegate plugs and seats.

FIG. 12 shows some examples of turbine wastegates grouped as a conical plug group 1210, a toroidal plug group 1230 and a spherical plug group 1250, which may, for example, include a modified sphere (e.g., a portion of a modified sphere).

In the group 1210, a plug 1212 includes a conical shape and a seat 1214 includes a corner shape 1214, a radiused shape 1216 (e.g., a portion of a toroidal surface) or an elliptical shape (e.g., a portion of an elliptical surface).

In the group 1230, a plug 1232 includes a radiused shape (e.g., a portion of a torodial surface) and a seat includes a corner shape 1234, a conical shape 1235, a radiused shape 1236 or an elliptical shape 1237.

In the group 1250, a plug 1252 includes a shape (e.g., a portion of a spherical surface or a portion of a modified spherical surface) and a seat includes a corner shape 1254, a conical shape 1255, a radiused shape 1256 or an elliptical shape 1257.

In the examples of FIG. 12, a torus may be defined by a radius (or major and minor axes) and a diameter and a sphere or modified sphere may be defined by a radius, radii, one or more major axes, one or more minor axes, etc.; noting that a spherical section or a modified spherical section may be defined by a surface such as a plane cutting a sphere or a modified sphere. As an example, a cone or conical portion may be defined by an angle and an axis and, for example, a position or positions along the axis.

Figure 13:
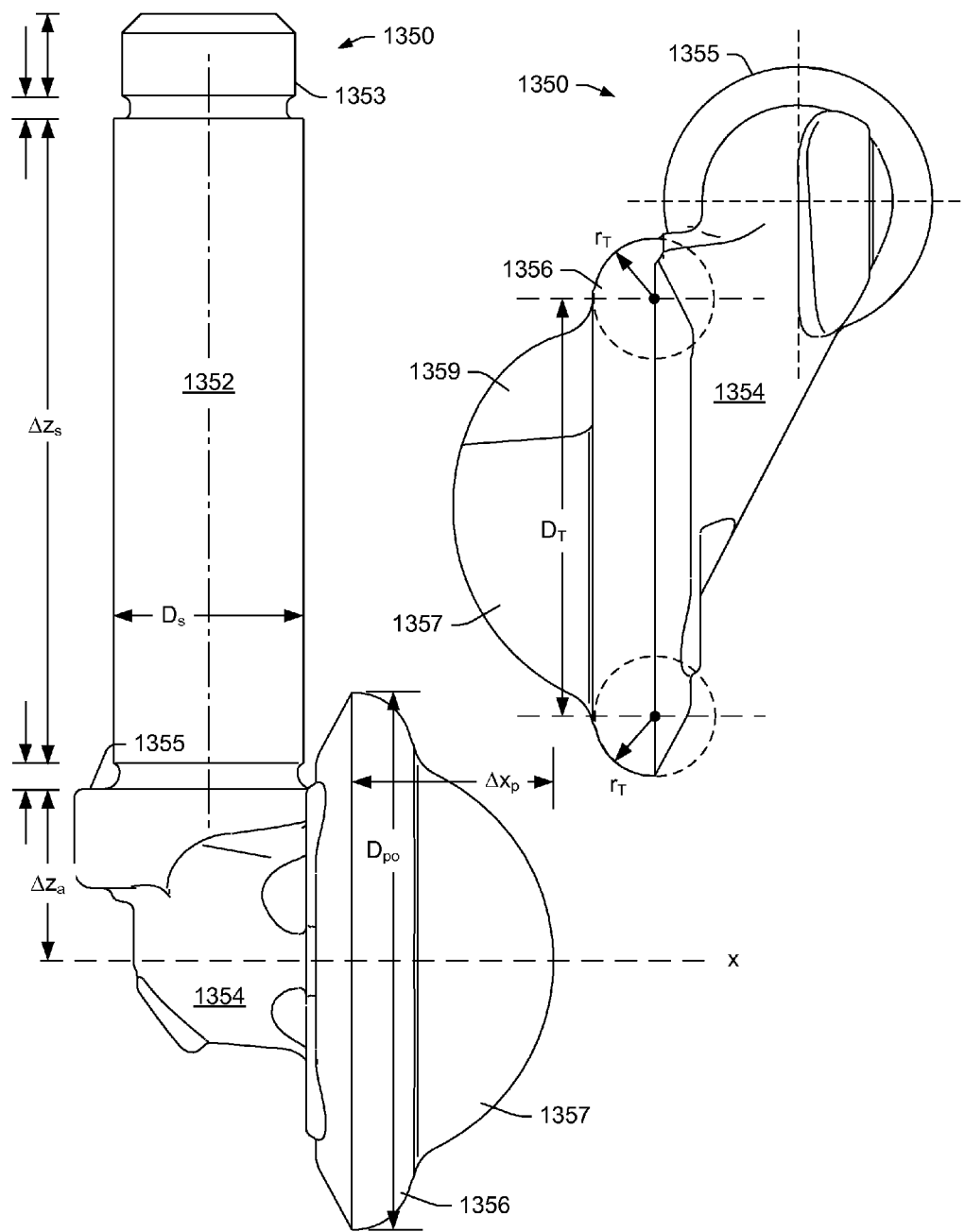
FIG. 13 is a series of views of an example of a wastegate arm and plug.

FIG. 13 shows an example of a wastegate arm and plug 1350 that may be included in an assembly such as, for example, the assembly 200 of FIG. 2 (e.g., where the wastegate arm and plug 1350 is included rather than the wastegate arm and plug 250). As an example, the wastegate arm and plug 1350 may be made of material (e.g., metal, alloy, etc.) suitable for temperatures experienced during operation of an exhaust turbine (e.g., of a turbocharger).

In the example of FIG. 13, the wastegate arm and plug 1350 includes a shaft 1352 that includes a diameter $D_s$ over a length $\Delta z_s$, an arm 1354 that extends axially outwardly away from the shaft 1352 from a shoulder 1355 and radially downwardly to a plug 1356. An axial dimension $\Delta z_a$ is shown in the example of FIG. 13 as being a distance from the shoulder 1355 to a centerline of the plug 1356. The plug 1356 is shown as having an outer diameter $D_{po}$. As an example, the centerline of the plug 1356 may define or coincide with an x-axis that may, for example, be used as a reference to describe features of the arm 1354, the plug 1356, angles of rotation of the arm 1354 and the plug 1356, etc. For example, in FIG. 13, the plug 1356 is shown as including a modified sphere portion extending axially outward along the x-axis (e.g., a distance $\Delta x_p$), for example, from a toroidal portion of the plug 1356 defined at least in part by a radius $r_T$ where, for example, the modified sphere portion has a perimeter less than a circumference having a diameter $D_T$ associated with the toroidal portion of the plug 1356 (e.g., in a projected view, the perimeter may be within the circumference). As shown in the example of FIG. 13, the modified sphere portion of the plug 1356 includes a sphere portion 1357 and a modified portion 1359 that, for example, together define a modified sphere shape. As shown in the example of FIG. 13, the modified sphere portion may be a portion of a modified sphere (e.g., a modified sphere cut by a plane, etc.).

As mentioned with respect to the wastegate arm and plug 250 of FIG. 2, the wastegate arm and plug 1350 may, likewise, include a dimension ΔSP as a leg of a triangle that, for example, defines a hypotenuse as a dimension between a rotational axis of the arm 1354 and the centerline of the plug 1356. FIG. 13 also shows various other features, for example, shaft features such as shoulders, contours, etc.

Figure 14:
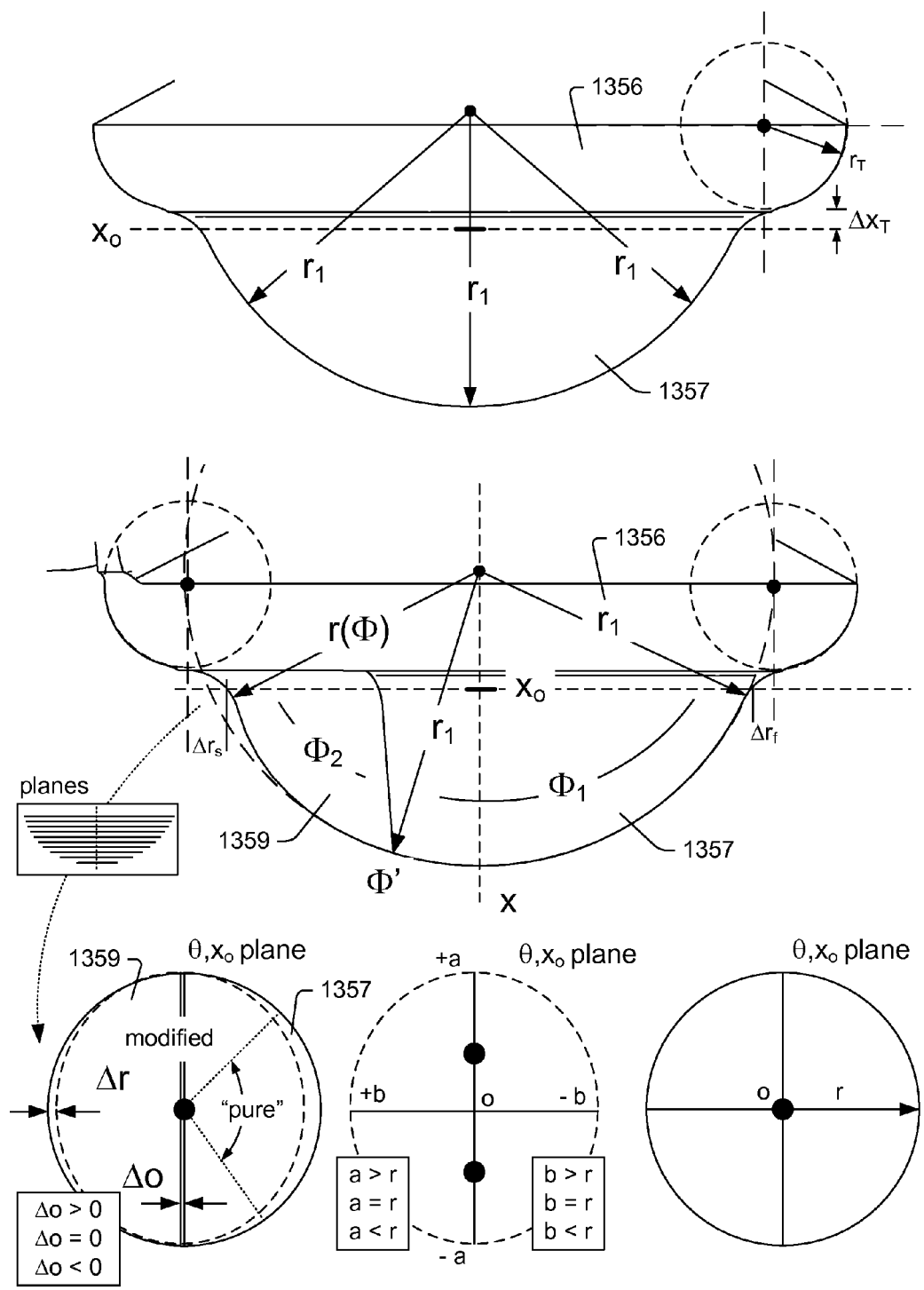
FIG. 14 is a series of views of a plug profile of the wastegate arm and plug of FIG. 13.

FIG. 14 shows a series of views of a plug profile of the wastegate arm and plug 1350 of FIG. 13 along with a plot 1510 of a plug profile. As mentioned, the plug 1356 can include the sphere portion 1357 and the modified portion 1359 that may together define a modified sphere shape. As shown in a front view (upper view), the sphere portion 1357 of the plug 1356 may be defined by a substantially uniform radius $r_1$; noting that a reference plane $x_o$ may be defined as coinciding with a change in curvature, etc. and may define a "base" of a modified sphere portion. As an example, the reference plane $x_o$ may be defined as being a distance $\Delta x_T$ from a toroidal portion of the plug 1356, for example, where a transition profile exists between the toroidal portion and the modified sphere portion of the plug 1356.

As shown in a side view (middle view), the sphere portion 1357 transitions to the modified portion 1359, for example, at an angle Φ' (e.g., at a transition boundary that may be defined by angles $\Phi_1$ and $\Phi_2$). The modified portion 1359 may include a diminishing radius, for example, a radius that diminishes with respect to the angle Φ. As shown in the side view, the modified sphere portion (e.g., portions 1357 and 1359) is asymmetric. An asymmetry may be defined by one or more distances, for example, with respect to the toroidal portion of the plug 1356. For example, distances between an axis of a toroid cross-section and the modified sphere portion differ for a shaft side of the plug 1356 and a front side of the plug 1356 where the distance at the shaft side $\Delta r_s$ is larger than at the front side $\Delta r_f$. As an example, the distance at the shaft side $\Delta r_s$ may be equal to or greater than about 1 mm (e.g., a portion of a modified sphere where for a perimeter of a base plane, a radius on one side is less than the radius on an opposing side). In such an example, a clearance may be formed between the shaft side of the modified sphere and a wastegate seat (e.g., a clearance of about 1 mm or more), for example, when a plug is in a closed position (see also, e.g., FIG. 16).

FIG. 14 shows an example of how a modified sphere portion may be formed, defined, etc. with respect to a plane orthogonal to the x-axis, in particular, a θ, $x_o$ plane (e.g., where a series of planes may define a modified sphere portion). In the example plane, a circle with a radius r may define in part the sphere portion 1357 and an ellipse with major axis "a" and minor axis "b" may define in part the modified portion

1359. In combination, the circle and the ellipse may define a radius differential Δr of the plug 1356, for example, at a shaft side of the plug 1356 (see also, e.g., $\Delta r_s$). As an example, the origin of the circle and the origin of the ellipse may be offset, as indicated by an offset Δo. As indicated in FIG. 14, a major axis or a minor axis may be greater than a circle radius, less than a circle radius, or equal to a circle radius. As an example, the ellipse may be rotated by a number of degrees, for example, such that the major axis is aligned from the shaft side to the front side of a plug (e.g., rather than the minor axis as shown in the example of FIG. 14). As indicated in FIG. 14, an offset may be positive or negative or zero (e.g., defined with respect to a shaft side and a front side of a plug). As an example, a series of cross-sections may include at least some cross-sections that include a perimeter definable in part by an ellipse and definable in part by a circle. For example, such a series of cross-sections may characterize a "pure" sphere shape and a modified shape, which together may characterize a modified sphere portion of a plug.

Figure 15:
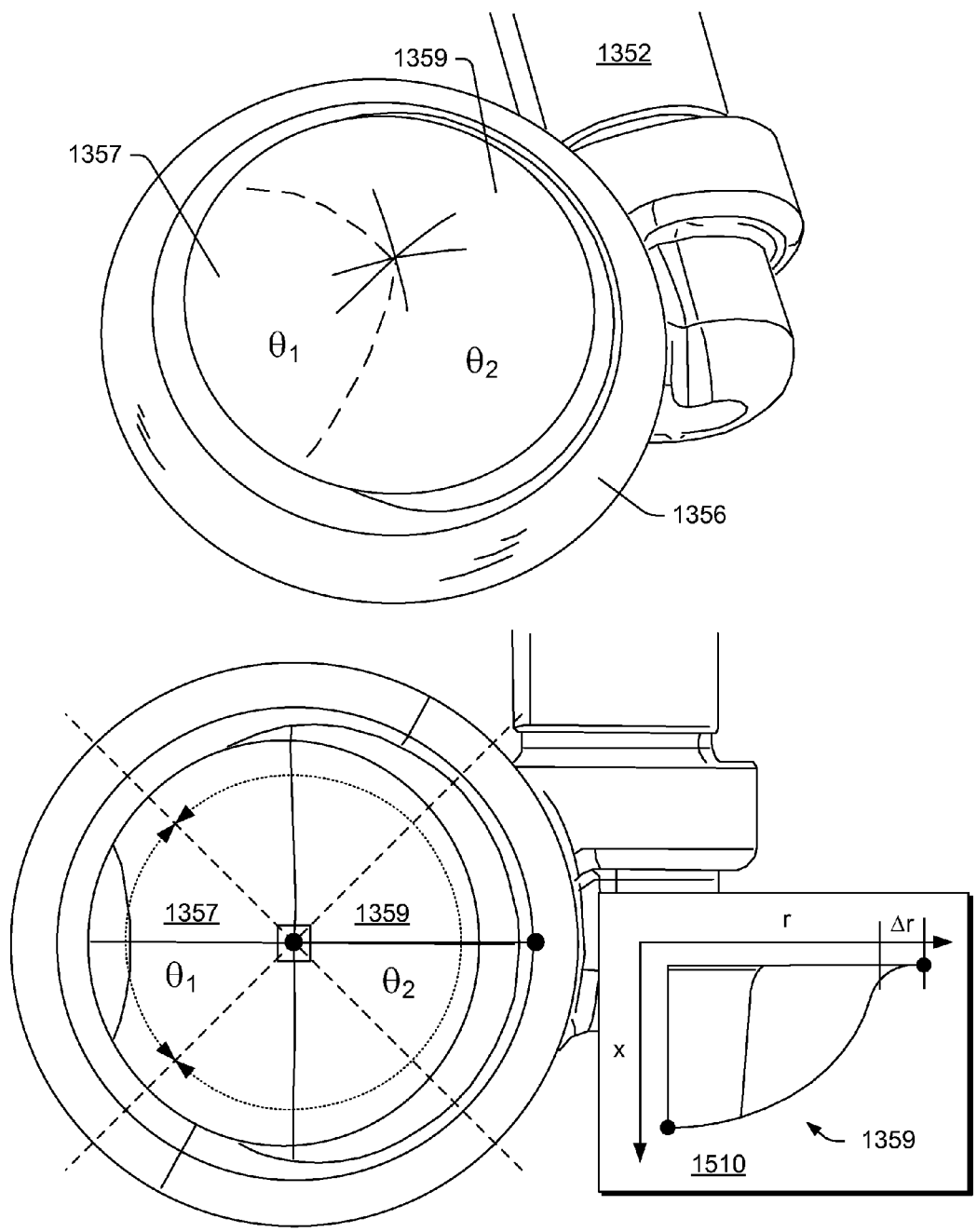
FIG. 15 is a perspective view of a portion of the wastegate arm and plug of FIG. 13 and a plot of the plug profile thereof.

FIG. 15 shows a perspective view of a portion of the wastegate arm and plug 1350 and a plot 1510 of a plug profile thereof (e.g., per a side view). As shown in FIG. 15, the sphere portion 1357 may be defined in part by an angle $\theta_1$ (e.g., that spans the front side of the plug 1356) while the modified portion 1359 may be defined in part by an angle $\theta_2$ (e.g., that spans the shaft side of the plug 1356). In the example of FIG. 15, a diameter of a lower edge of a toroidal portion of the plug 1350 may be used as a reference to define, in part, the radius differential Δr. For example, the plot 1510 of the plug profile that includes at least a portion of the modified portion 1359 shows how the outer surface of the modified sphere portion changes over in an axial direction (e.g., x) with respect to a radial direction (e.g., r, where r may be defined from the x-axis).

Figure 16:
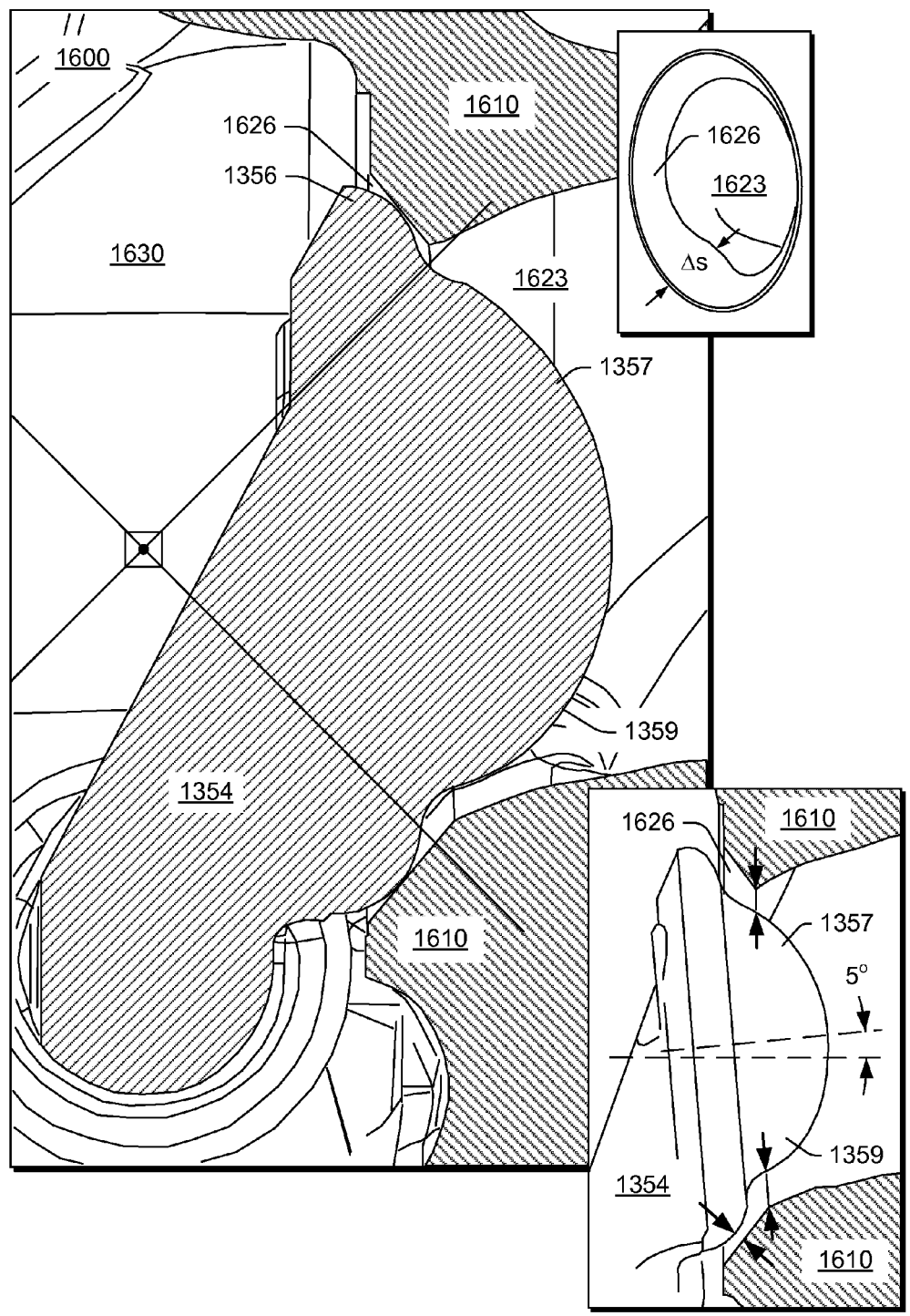
FIG. 16 is a series of cutaway views of an example of an assembly that includes the wastegate arm and plug of FIG. 13.

FIG. 16 shows a series of cutaway views of an example of an assembly 1600 that includes the wastegate arm and plug 1350. As shown in the example of FIG. 16, the assembly 1600 includes a housing 1610 (see, e.g., the housing 210 of FIG. 2) that includes a wastegate wall 1623 that extends to a wastegate seat 1626 and that includes an exhaust chamber 1630. In the example of FIG. 16, the turbine housing 1610 may be a single piece or multi-piece housing. As an example, the turbine housing 1610 may be a cast component (e.g., formed via sand casting or other casting process). As an example, the housing 1610 may be made of material (e.g., metal, alloy, etc.) suitable for temperatures experienced during operation of an exhaust turbine (e.g., of a turbocharger).

The turbine housing 1610 includes various walls, which can define features such as a bore, a turbine wheel opening, an exhaust outlet opening, etc. In particular, in the example of FIG. 16, the wastegate wall 1623 defines a wastegate passage in fluid communication with an inlet conduit where a wastegate control linkage and a wastegate arm and plug 1350 are configured for opening and closing the wastegate passage (e.g., for wastegating exhaust).

In an upper inset view, an example shape for the wastegate seat 1626 is illustrated, for example, where a seat depth (e.g., from the exhaust chamber 1630 to the space defined by the wastegate wall 1623) may be greater on a shaft side (see, e.g., Δs) than on a front side.

FIG. 16 shows how the toroidal portion and the modified sphere portion of the plug 1356 may be oriented with respect to the wastegate seat 1626, which may be a conical seat. As shown, the toroidal portion of the plug 1356 can seat against the wastegate seat 1626 when the wastegate arm and plug 1350 is in a closed position. Further, in a closed position, a clearance exists about the modified sphere portion (e.g., where the surface of the modified sphere portion does not contact the wastegate seat 1626).

As shown in a lower inset view, when the wastegate arm and plug 1350 is in an open position of approximately 5 degrees (e.g., about 5 degrees of rotation of the shaft 1352 in a bore of the housing 1610), the surface of the modified sphere portion of the plug 1356 defines a clearance with respect to the wastegate seat 1626 (see, e.g., front side and shaft side arrows). Where a pressure differential exists (e.g., higher pressure on the wastegate wall side 1623), exhaust may flow through the clearance (e.g., an annulus or modified annulus in cross-section) where characteristics of such flow is determined, in part, by the surface of the modified sphere portion of the plug 1356 and, in part, by the surface of the wastegate seat 1626. For example, flow may impinge against the surface of the modified sphere portion of the plug 1356 to form a stagnation point about which flow is diverted radially outwardly therefrom and, for example, toward a clearance between the plug 1356 and the wastegate seat 1626.

Further, as shown in the example of FIG. 16, on a shaft side of the plug 1356, the toroidal portion of the plug 1356 also defines a clearance with respect to the wastegate seat 1626 (e.g., where rotation rotates the front side of the plug 1356 a greater arc distance than the shaft side of the plug 1356). Accordingly, in the example of FIG. 16, for the assembly 1600, both the toroidal portion and the modified sphere portion of the plug 1356 define clearances with respect to the wastegate seat 1626 of the housing 1610. These clearances (e.g., over a range of "open" angles), act to "control" characteristics of exhaust flow. For example, flow characteristics may be controlled by inter-component clearance shapes over a range of open angles in a manner that enhances controllability of a wastegate. As an example, the assembly 1600 may provide for a monotonic and smooth evolution of pressure with respect to wastegate valve opening where such characteristics enhance controllability of the wastegate valve. Such an approach may particularly enhance control where a wastegate valve actuator is a mechanical vacuum actuator (e.g., an actuator to rotate a wastegate arm and plug with respect to a wastegate seat).

Figure 17:
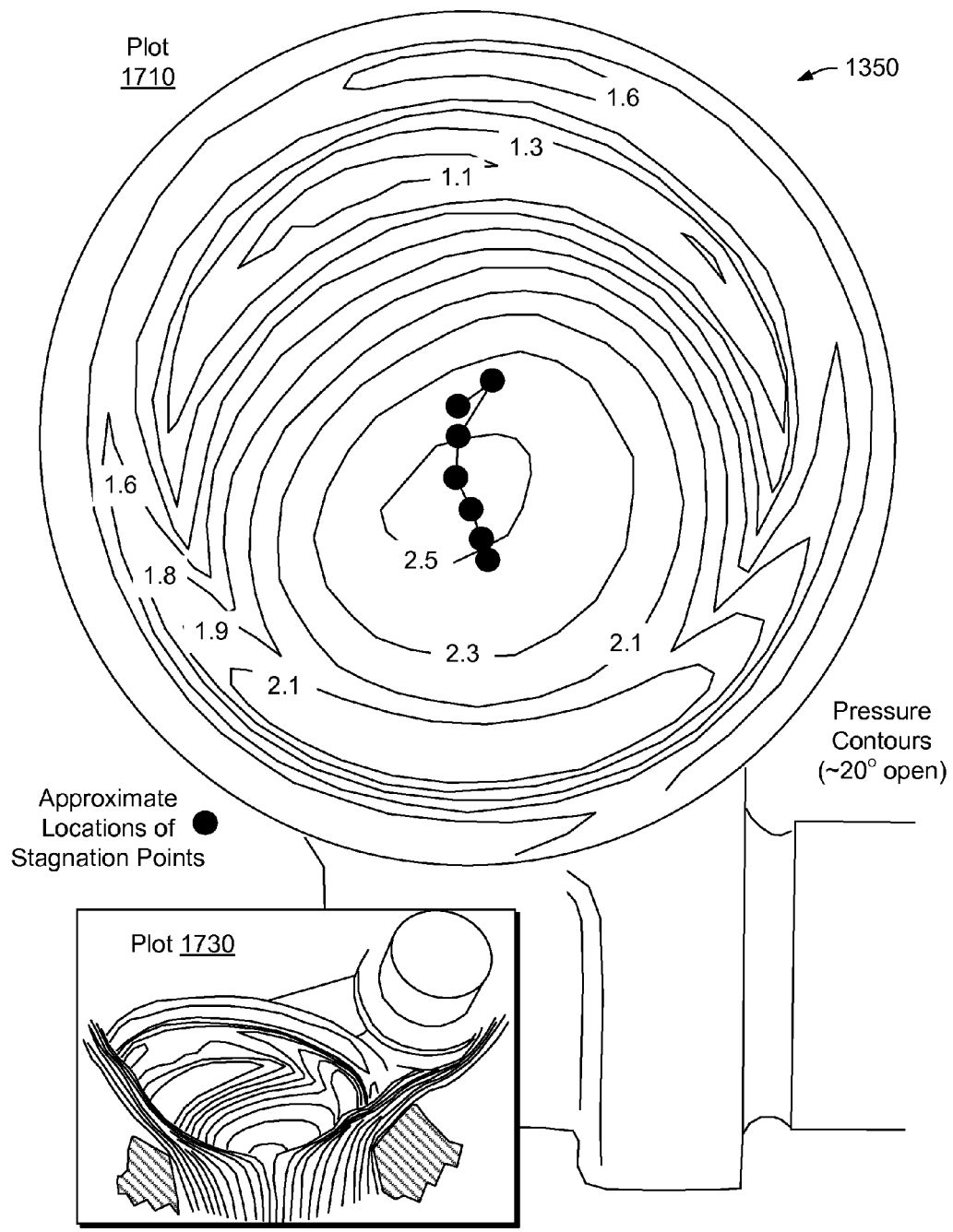
FIG. 17 is a series of examples of plots of data for the assembly of FIG. 16.

FIG. 17 shows examples of plots 1710 and 1730 of trial data for the assembly of FIG. 16. As shown in FIG. 17, the plot 1710 is a pressure contour plot for an open angle of about 20 degrees. In the plot 1710, a series of filled circles approximate locations of points (e.g., stagnation points or pressure maxima) over a range of angles from about 2.5 degrees open to about 30 degrees open (e.g., without correction of perspective of the plug 1356). The plot 1730 shows flow streamlines as well as pressure contours, for example, to illustrate how exhaust flows through a plug-seat clearance for an open angle of about 20 degrees. As mentioned, a high pressure may correspond to a stagnation point about which flow is diverted radially outwardly to flow through a plug-seat clearance. As mentioned, for at least some open angles, both a toroidal portion of a plug and a modified sphere portion of a plug may define a plug-seat clearance. As open angle changes, the shape of the plug-seat clearance also changes. As illustrated in the example of FIG. 17, the locations of pressure maxima experienced by a plug over a range of open angles may be "controlled" at least in part by shape of the plug and, for example, at least in part by shape of a wastegate seat.

As an example, in fluid dynamics, a stagnation point may be a point in a flow field where local velocity of fluid is approximately zero. A stagnation point may exist at a surface of an object in a flow field, for example, where fluid is brought to rest by presence of the object in the flow field (e.g., consider a bluff body in a flow field). As an example, the Bernoulli equation may demonstrate how static pressure is highest where velocity is zero (e.g., such that static pressure or "stagnation pressure" may be at its maximum value at a stagnation point). Where the object is movable in a flow field via an actuator, the pressure experienced by the object may be transmitted to the actuator. If a movable object "catches" wind while being moved by an actuator (e.g., a sharp transition such as a step transition in pressure), the actuator may be impacted as well. As an example, the shape of the plug 1356 may help reduce impact on an actuator as the actuator rotates the plug 1356 with respect to a wastegate opening that provide for flow of exhaust.

Figure 18:
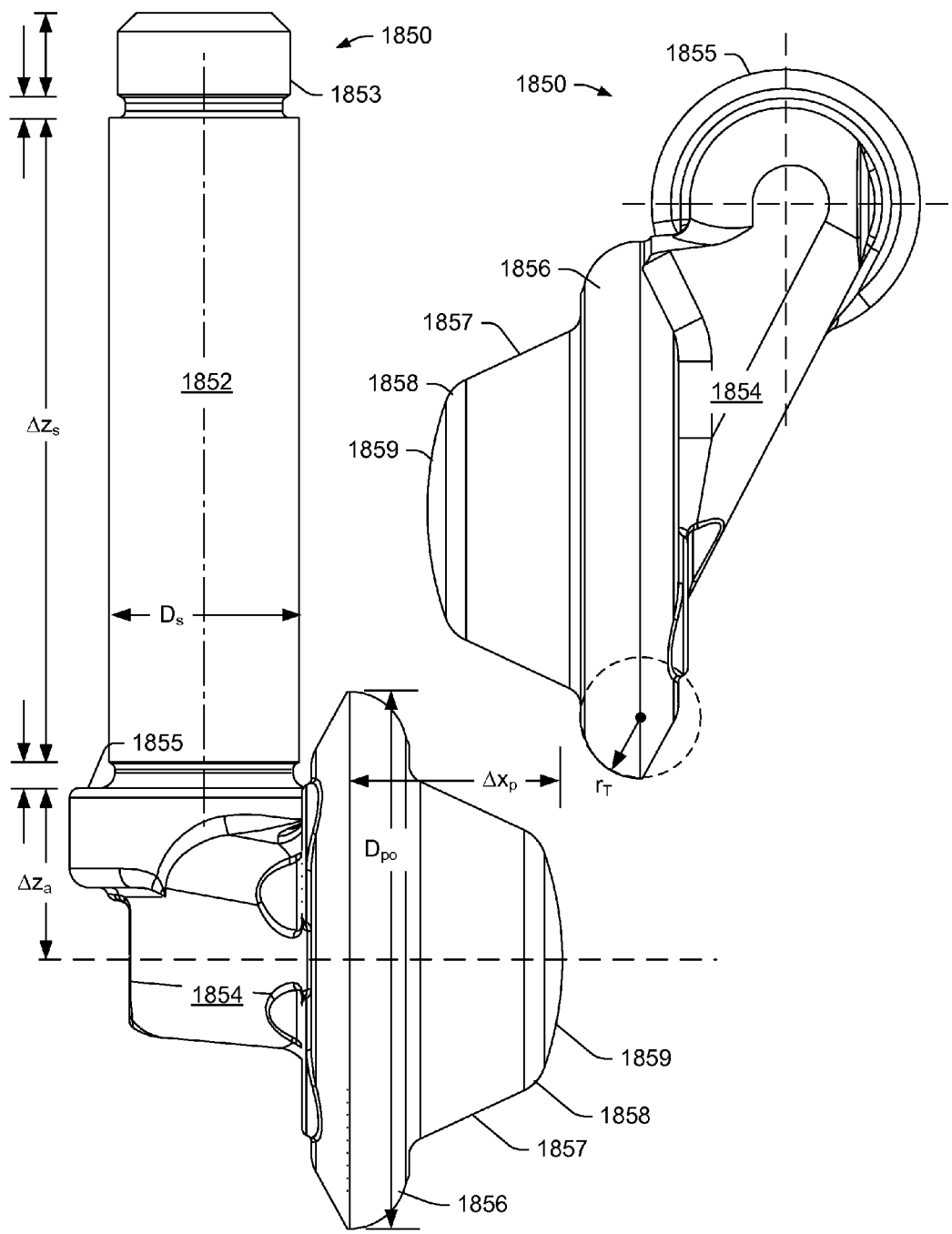
FIG. 18 is a series of views of an example of a wastegate arm and plug.

FIG. 18 shows a series of views of an example of a wastegate arm and plug 1850 that may be included in an assembly such as, for example, the assembly 200 of FIG. 2 (e.g., where the wastegate arm and plug 1850 is included rather than the wastegate arm and plug 250).

In the example of FIG. 18, the wastegate arm and plug 1850 includes a shaft 1852 that includes a diameter $D_s$ over a length $\Delta z_s$, an arm 1854 that extends axially outwardly away from the shaft 1852 from a shoulder 1855 and radially downwardly to a plug 1856. An axial dimension $\Delta z_a$ is shown in the example of FIG. 18 as being a distance from the shoulder 1855 to a centerline of the plug 1856. The plug 1856 is shown as having an outer diameter $D_{po}$. As an example, the centerline of the plug 1856 may define or coincide with an x-axis that may, for example, be used as a reference to describe features of the arm 1854, the plug 1856, angles of rotation of the arm 1854 and the plug 1856, etc. For example, in FIG. 18, the plug 1386 is shown as including a cone portion 1857 extending axially outward along the x-axis (e.g., a distance $\Delta x_p$), for example, from a toroidal portion of the plug 1856 defined at least in part by a radius $r_T$. As an example, the plug 1856 may include a sphere portion 1859 as an end cap to the cone portion 1857. In such an example, pressure maxima with respect to open angles may be limited to the sphere portion 1859. For example, stagnation points may be limited to the sphere portion 1859 of the plug 1856 whereby flow is directed radially outwardly therefrom (e.g., toward the cone portion 1857). As an example, the plug 1856 may include a toroidal portion 1858 disposed between the cone portion 1857 and the sphere portion 1859 (e.g., as a transition region).

As mentioned with respect to the wastegate arm and plug 250 of FIG. 2, the wastegate arm and plug 1850 may, likewise, include a dimension ΔSP as a leg of a triangle that, for example, defines a hypotenuse as a dimension between a rotational axis of the arm 1854 and the centerline of the plug 1856. FIG. 18 also shows various other features, for example, shaft features such as shoulders, contours, etc.

As an example, the wastegate arm and plug 1850 may be included in an assembly such as the assembly 1600 where the wastegate arm and plug 1850 is included rather than the wastegate arm and plug 1350. In such an example, the surface of the cone portion 1857 of the plug 1856 can define a clearance with respect to the wastegate seat 1626. Where a pressure differential exists (e.g., higher pressure on the wastegate wall side 1623), exhaust may flow through the clearance where characteristics of such flow is determined, in part, by the surface of the cone portion 1857 of the plug 1856 and, in part, by the surface of the wastegate seat 1626. Further, flow may impinge against the surface of the sphere portion 1859 (e.g., optionally a modified sphere) to form a stagnation point about which flow is diverted radially outwardly therefrom and, for example, toward a clearance between the plug 1856 and the wastegate seat 1626.

Yet further, on a shaft side of the plug 1856, the toroidal portion of the plug 1856 may also define a clearance with respect to the wastegate seat 1626. Accordingly, in such an example, both the toroidal portion and the cone portion of the plug 1856 may define clearances with respect to the wastegate seat 1626 of the housing 1610. These clearances (e.g., over a range of "open" angles), act to "control" characteristics of exhaust flow. For example, flow characteristics may be controlled by inter-component clearance shapes over a range of open angles in a manner that enhances controllability of a wastegate. As an example, the assembly 1600 including the wastegate arm and plug 1850 may provide for a monotonic and smooth evolution of pressure with respect to wastegate valve opening where such characteristics enhance controllability of the wastegate valve. Such an approach may particularly enhance control where a wastegate valve actuator is a mechanical vacuum actuator (e.g., an actuator to rotate a wastegate arm and plug with respect to a wastegate seat).

Figure 19:
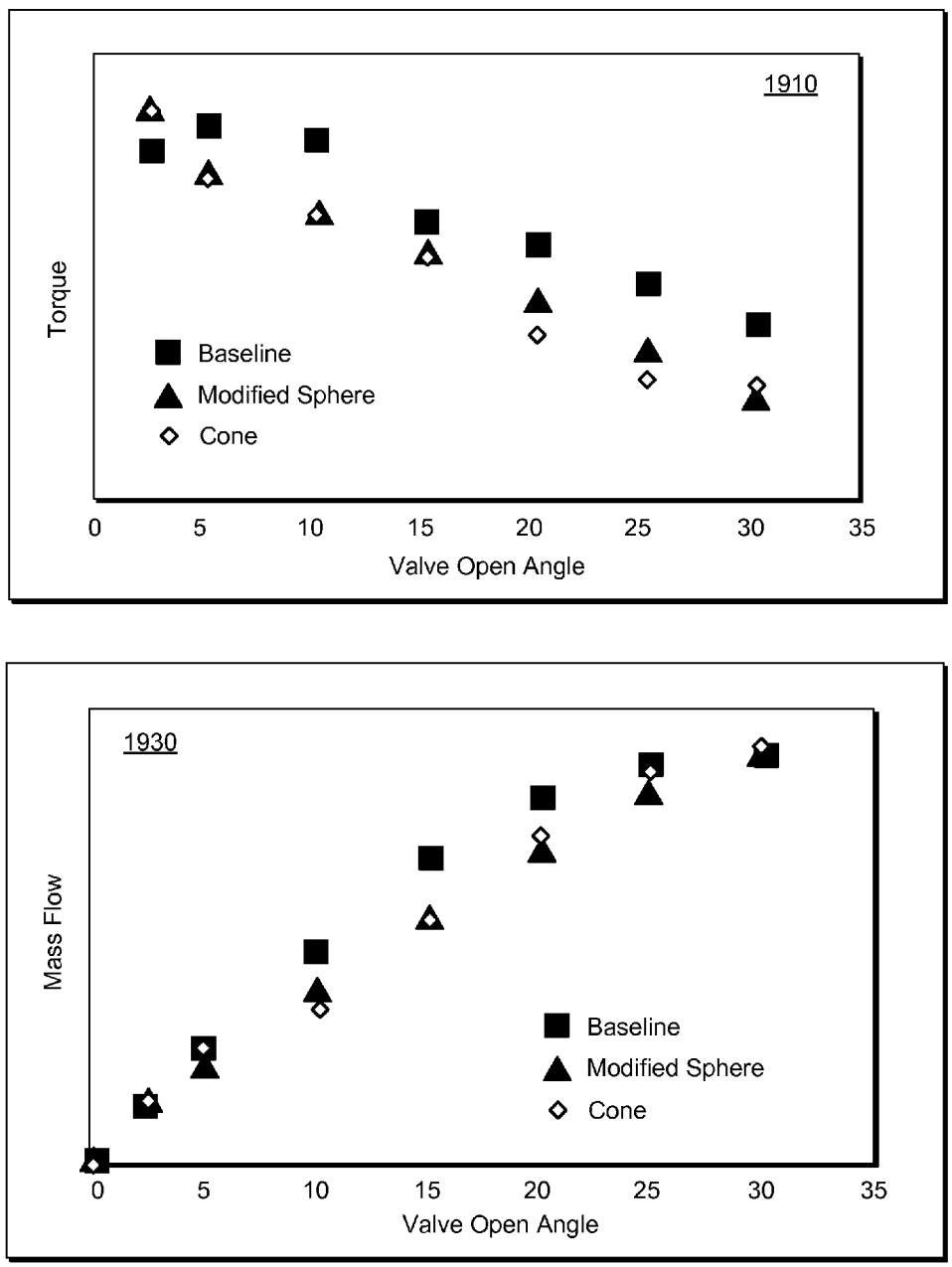
FIG. 19 is a series of examples of plots of data for various assemblies.

FIG. 19 shows a examples of plots 1910 and 1930 for data for various assemblies. As shown, the plot 1910 shows torque versus valve open angle for a baseline assembly that includes a flat plug (flat surface to seal against a flat seat), an assembly that includes a plug with a modified sphere portion and an assembly that includes a plug with a cone portion. In the latter two assemblies, a wastegate seat includes a conical portion and the plugs include a toroidal portion that may seat against the conical portion of the wastegate seat.

The data in the plot 1910 indicate that the assembly with the plug that includes a modified sphere portion has a substantially monotonic decrease in torque with respect to valve open angle (e.g., where torque may be defined as the cross product of a lever-arm distance and a force). Further, as shown in the plot 1910, for angles greater than about 5 degrees, the torque for the modified sphere and cone assemblies are less than that of the baseline (e.g., reduced loading for the modified sphere and cone assemblies).

The data in the plot 1930 indicate that the assembly with the plug that includes a modified sphere portion has a substantially monotonic increase in mass flow with respect to valve open angle. In contrast, the data for the baseline assembly indicate that mass flow levels off as valve open angle increases such that an increase in valve open angle (e.g., from about 25 degrees to about 30 degrees) does not act to substantially increase mass flow. In other words, for the baseline case, the mass flow is largely controlled over a smaller range of angles, which may impact control accuracy. When the mass flow of the baseline case is combined with the torque results, the accuracy of mass flow may be further complicated as an actuator may have to contend with increased torque and unevenness in torque over a range of angles (e.g., from about zero degrees to about 25 degrees). In other words, the fact that torque may decrease rather "evenly" for angles of about 25 degrees or more, the mass flow data indicate that, in such a range, there may be little change in mass flow (e.g., no or little result on operation of a turbocharger).

As demonstrated by trial data (e.g., numerical trials), torque and mass flow for an assembly with a plug that includes a modified sphere and for an assembly with a plug that includes a cone may be superior compared to an assembly with a plug that includes a flat plane. As an example, an assembly with a plug that includes a modified sphere or an assembly with a plug that includes a cone may, compared to an assembly with a plug that includes a flat plane, exhibit less noise (e.g., chatter or clapping), greater durability, greater sealing and/or greater controllability.

As an example, an assembly can include a turbine housing that includes a bore, a wastegate seat and a wastegate passage that extends to the wastegate seat; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a torus, for contacting the wastegate seat to cover the wastegate passage. In such an assembly, the wastegate shaft, the wastegate arm and the wastegate plug may be a unitary component (e.g., a monoblock wastegate arm and plug).

As an example, a wastegate plug can include a profile defined in part by a portion of a cone. As an example, a wastegate seat can include a profile defined in part by a cone.

As an example, wastegate plug can include a profile defined in part by a portion of the torus where that portion is disposed between an inner diameter and an outer diameter of the wastegate plug.

As an example, an assembly can include a wastegate shaft with an axis where a turbine housing includes a bore with an axis. In such an example, for a predetermined angular misalignment of the axes, a wastegate plug connected to the wastegate shaft can include a profile defined in part by a portion of a torus where along that profile, the wastegate plug provides for contacting a wastegate seat to cover a wastegate passage.

As an example, an assembly can include a wastegate shaft with an axis where a turbine housing includes a bore with an axis. In such an example, for a predetermined displacement misalignment of the axes, a wastegate plug connected to the wastegate shaft can include a profile defined in part by a portion of a torus where along that profile, the wastegate plug provides for contacting a wastegate seat to cover a wastegate passage.

As an example, a wastegate plug may include a profile defined in part by a torus, for example, an elliptical torus having a minor axis length that differs from a major axis length. In such an example, an elliptical torus may include a tilt angle (e.g., where the major axes are not parallel).

As an example, a profile of a wastegate plug can include a conical angle defined by a tangent to a maximum outer diameter of the torus. In such an example, a wastegate seat can include a conical angle where the conical angle of the wastegate seat exceeds the conical angle of the wastegate plug.

As an example, an assembly can include a turbine housing that includes a bore, a wastegate seat and a wastegate passage that extends to the wastegate seat; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a sphere, for contacting the wastegate seat to cover the wastegate passage. In such an example, the wastegate shaft, the wastegate arm and the wastegate plug may be a unitary component (e.g., a monoblock wastegate arm and plug). As an example, a wastegate seat can include a profile defined in part by a cone while a wastegate plug can include a profile defined at least in part by a sphere. As an example, a wastegate shaft can include an axis and a bore for receipt of the wastegate shaft can include an axis where, for a predetermined displacement misalignment of the axes, a wastegate plug, along a profile defined in part by at least a portion of a sphere, provides for contacting a wastegate seat to cover a wastegate passage. In such an example, the wastegate seat may include a portion defined at least in part by a cone.

As an example, an assembly can include a turbine housing that includes a bore, a wastegate seat and a wastegate passage that extends to the wastegate seat, where the wastegate seat includes a profile, defined in part by a portion of a torus; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a cone, for contacting the wastegate seat to cover the wastegate passage. In such an example, the wastegate shaft, the wastegate arm and the wastegate plug may be a unitary component (e.g., a monoblock wastegate arm and plug). As an example, a portion of a torus can include a portion of an elliptical torus having a minor axis length that differs from a major axis length. In such an example, the elliptical torus may include a tilt angle.

As an example, a wastegate shaft can include an axis and a bore for receipt of the wastegate shaft may include an axis where, for a predetermined displacement misalignment of the axes, a wastegate plug, along a profile defined in part by a portion of the cone, provides for contacting a wastegate seat, along a profile defined in part by a portion of a torus, to cover a wastegate passage.

As an example, an assembly can include a turbine housing that includes a bore, a wastegate seat and a wastegate passage that extends to the wastegate seat; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a torus, for contacting the wastegate seat to cover the wastegate passage in a closed state, and defined in part by a portion of a modified sphere, for defining a clearance with respect to the wastegate seat in an open state In such an example, the wastegate arm and the wastegate plug or the wastegate shaft, the wastegate arm and the wastegate plug may be a unitary component.

As an example, a portion of a modified sphere can include a cross-section defined at least in part by a portion of an ellipse. In such an example, the cross-section may be defined at least in part by a portion of a circle. As an example, a wastegate plug can include a shaft side and a front side where a cross-section is defined by a portion of an ellipse over a span that includes the wastegate shaft side of the wastegate plug and defined by a portion of a circle over a span that includes the front side of the wastegate plug.

As an example, an assembly can include a wastegate seat that includes a profile defined in part by a cone. In such an example, a profile of a wastegate plug defined in part by a portion of a torus may contact the profile of the wastegate seat defined in part by the cone to cover the wastegate passage in a closed state. As an example, a profile of a wastegate plug defined in part by a portion of a modified sphere may define a clearance with respect to a profile of a wastegate seat defined in part by a cone in a closed state. As an example, a profile of a wastegate plug defined in part by a portion of a modified sphere may define a clearance with respect to a profile of a wastegate seat defined in part by a cone in an open state. In such an example, the open state may include an open angle in a range greater than approximately zero degrees to approximately 30 degrees.

As an example, an assembly can include wastegate shaft with an axis and a housing with a bore that includes an axis where for a predetermined angular misalignment of the axes (e.g., and/or displacement misalignment of the axes), a wastegate plug controlled by the wastegate shaft, along a profile defined in part by a portion of a torus, provides for contacting a wastegate seat of the housing to cover a wastegate passage of the housing.

As an example, an assembly can include a turbine housing that includes a bore, a wastegate seat and a wastegate passage that extends to the wastegate seat; a bushing configured for receipt by the bore; a rotatable wastegate shaft configured for receipt by the bushing; a wastegate arm extending from the wastegate shaft; and a wastegate plug extending from the wastegate arm where the wastegate plug includes a profile, defined in part by a portion of a torus, for contacting the wastegate seat to cover the wastegate passage in a closed state, and defined in part by a portion of a cone, for defining a clearance with respect to the wastegate seat in an open state. In such an example, the wastegate arm and the wastegate plug or the wastegate shaft, the wastegate arm and the wastegate plug may be a unitary component.

As an example, a portion of a cone of a profile of a wastegate plug may include a cross-section defined at least in part by a circle. As an example, a profile of a wastegate plug may be further defined in part by a portion of a sphere such that the profile of the wastegate plug includes a cone profile portion and a sphere profile portion. In such an example, between the cone profile portion and the sphere profile portion, the profile of the wastegate plug may be further defined in part by a portion of a torus.

As an example, an assembly can include a housing with a wastegate seat that includes a profile defined in part by a cone. In such an example, a profile of a wastegate plug defined in part by a portion of a torus may contact the profile of the wastegate seat defined in part by the cone to cover the wastegate passage in the closed state. As an example, a profile of a wastegate plug defined in part by a portion of a cone may define a clearance with respect to a profile of a wastegate seat defined in part by a cone in an open state where, for example, the open state includes an open angle in a range greater than approximately zero degrees to approximately 30 degrees.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. An assembly comprising:
    a turbine housing that comprises a bore, a wastegate seat and a wastegate passage that extends to the wastegate seat;
    a bushing configured for receipt by the bore;
    a rotatable wastegate shaft configured for receipt by the bushing;
    a wastegate arm extending from the wastegate shaft; and
    a wastegate plug extending from the wastegate arm wherein the wastegate plug comprises
    a toroidal portion with a profile defined in part by a portion of a torus that defines a wastegate plug axis and that contacts the wastegate seat to cover the wastegate passage in a closed state, and
    wherein the wastegate plug comprises a modified sphere portion with a profile defined in part by a portion of a modified sphere that defines a clearance with respect to the wastegate seat in an open state,
    wherein the modified sphere portion comprises, in a plane perpendicular to the wastegate plug axis, a portion of the plug proximal the wastegate shaft on a wastegate shaft side and a portion of the plug opposite the wastegate shaft on a front side and wherein, in the plane perpendicular to the wastegate plug axis, a wastegate shaft side radial dimension of the profile of the modified sphere portion is less than a front side radial dimension of the profile of the modified sphere portion.

2. The assembly of claim 1 wherein the wastegate shaft, the wastegate arm and the wastegate plug comprise a unitary component.

3. The assembly of claim 1 wherein the portion of the modified sphere comprises a cross-section defined at least in part by a portion of an ellipse.

4. The assembly of claim 3 wherein the cross-section is defined at least in part by a portion of a circle.

5. The assembly of claim 4 wherein the cross-section is defined by the portion of the ellipse over a span that includes the wastegate shaft side of the wastegate plug and defined by the portion of the circle over a span that includes the front side of the wastegate plug.

6. The assembly of claim 1 wherein the wastegate seat comprises a profile defined in part by a cone.

7. The assembly of claim 6 wherein the profile of the wastegate plug defined by the portion of the torus contacts the profile of the wastegate seat defined in part by the cone to cover the wastegate passage in the closed state.

8. The assembly of claim 1 wherein the open state comprises an open angle in a range greater than approximately zero degrees to approximately 30 degrees.

9. The assembly of claim 1 wherein the profile of the modified sphere portion is defined in part by a series of planes perpendicular to the wastegate plug axis wherein each of the planes comprises a portion of a circle and a portion of an ellipse.

10. The assembly of claim 1 wherein, in a plane perpendicular to the wastegate plug axis, the front side of the modified sphere portion comprises a profile defined by a portion of a circle.

11. The assembly of claim 1 wherein, in a plane perpendicular to the wastegate plug axis, the shaft side of the modified sphere portion comprises a profile defined by a portion of an ellipse.

12. A wastegate of an exhaust turbine, comprising:
    a wastegate shaft;
    an arm that extends from the wastegate shaft; and
    a plug that extends from the arm wherein the plug comprises
    a toroidal portion with a profile defined by a portion of a torus that defines a wastegate plug axis of the plug of the exhaust turbine; and
    wherein the plug further comprises a modified sphere portion with a profile defined by a portion of a modified sphere, wherein the modified sphere portion comprises, in a plane perpendicular to the wastegate plug axis, a portion of the plug proximal the wastegate shaft on a wastegate shaft side and a portion of the plug opposite the wastegate shaft on a front side and wherein, in the plane perpendicular to the wastegate plug axis, a wastegate shaft side radial dimension of the profile of the modified sphere portion is less than a front side radial dimension of the profile of the modified sphere portion.

13. The apparatus of claim 12 wherein the wastegate shaft, the arm and the plug comprise a unitary component.

14. The apparatus of claim 13 wherein the profile of the modified sphere portion is defined in part by a series of planes perpendicular to the wastegate plug axis wherein each of the planes comprises a portion of a circle and a portion of an ellipse.

15. The apparatus of claim 13 wherein, in a plane perpendicular to the wastegate plug axis, the front side of the modified sphere portion comprises a profile defined by a portion of a circle.

16. The apparatus of claim 13 wherein, in a plane perpendicular to the wastegate plug axis, the wastegate shaft side of the modified sphere portion comprises a profile defined by a portion of an ellipse.

* * * * *